United States Patent
Ikegami et al.

(10) Patent No.: US 8,992,674 B2
(45) Date of Patent: Mar. 31, 2015

(54) INK, INK CARTRIDGE AND INK JET RECORDING METHOD

(71) Applicant: Canon Kabushiki Kaisha, Tokyo (JP)

(72) Inventors: Masayuki Ikegami, Atsugi (JP); Masashi Ogasawara, Machida (JP); Tetsu Iwata, Yokohama (JP); Takashi Saito, Kawasaki (JP); Masashi Tsujimura, Kawasaki (JP); Yojiro Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/964,274

(22) Filed: Aug. 12, 2013

(65) Prior Publication Data
US 2014/0063157 A1 Mar. 6, 2014

(30) Foreign Application Priority Data
Sep. 5, 2012 (JP) .................................. 2012-194878

(51) Int. Cl.
*C09D 11/328* (2014.01)
(52) U.S. Cl.
CPC .................................... *C09D 11/328* (2013.01)
USPC .................. 106/31.52; 106/31.47; 106/31.48; 106/31.49
(58) Field of Classification Search
CPC .................................................... C09D 11/328
USPC ....................... 106/31.47, 31.48, 31.49, 31.52
See application file for complete search history.

(56) References Cited

U.S. PATENT DOCUMENTS

| 6,652,637 | B1 | 11/2003 | Mistry et al. |
| 6,746,114 | B2 | 6/2004 | Takahashi et al. |
| 6,830,329 | B2 | 12/2004 | Iwata |
| 6,923,855 | B2 * | 8/2005 | Harada et al. ............... 106/31.48 |

(Continued)

FOREIGN PATENT DOCUMENTS

| CN | 1756811 A | 4/2006 |
| EP | 1391488 A1 | 2/2004 |

(Continued)

OTHER PUBLICATIONS

Dec. 13, 2013 Search Report issued in European Patent Appln. No. 13004036.3.

(Continued)

*Primary Examiner* — Helene Klemanski
(74) *Attorney, Agent, or Firm* — Fitzpatrick, Cella, Harper & Scinto

(57) ABSTRACT

An ink containing a first coloring material and a second coloring material, the sum total of these contents being 6.0% by mass or less. The first coloring material is a black coloring material exhibiting a difference $\Delta\lambda_{max1}$ of 20.0 or more between a maximum absorption wavelength in a 20.0% by mass aqueous solution of 1,2-hexanediol and a maximum absorption wavelength in water, the second coloring material is a specific coloring material exhibiting a difference $\Delta\lambda_{max2}$ of 12.0 or less between a maximum absorption wavelength in a 20.0% by mass aqueous solution of 1,2-hexanediol and a maximum absorption wavelength in water, and the sum of the $\Delta\lambda_{max1}$ and the $\Delta\lambda_{max2}$ is 35.0 or less.

15 Claims, 4 Drawing Sheets

(56) References Cited

U.S. PATENT DOCUMENTS

| | | | | |
|---|---|---|---|---|
| 6,929,362 | B2 | 8/2005 | Takada et al. | |
| 6,932,465 | B2 | 8/2005 | Nito et al. | |
| 6,935,732 | B2 | 8/2005 | Takada et al. | |
| 7,004,579 | B2 | 2/2006 | Sato et al. | |
| 7,037,365 | B2 | 5/2006 | Taguchi et al. | |
| 7,056,972 | B2 | 6/2006 | Nakazawa et al. | |
| 7,067,590 | B2 | 6/2006 | Sato et al. | |
| 7,151,156 | B2 | 12/2006 | Sato et al. | |
| 7,208,032 | B2 | 4/2007 | Hakamada et al. | |
| 7,276,110 | B2 | 10/2007 | Tsujimura et al. | |
| 7,276,112 | B2 | 10/2007 | Tokuda et al. | |
| 7,297,196 | B2 * | 11/2007 | Matsumoto et al. | 106/31.47 |
| 7,297,203 | B2 | 11/2007 | Takada et al. | |
| 7,328,991 | B2 | 2/2008 | Sato et al. | |
| 7,354,145 | B2 | 4/2008 | Nito et al. | |
| 7,377,631 | B2 | 5/2008 | Takada et al. | |
| 7,402,200 | B2 | 7/2008 | Imai et al. | |
| 7,423,075 | B2 | 9/2008 | Ikegami et al. | |
| 7,427,319 | B2 * | 9/2008 | Yoneda et al. | 106/31.48 |
| 7,431,760 | B2 * | 10/2008 | Chino et al. | 106/31.48 |
| 7,439,282 | B2 | 10/2008 | Sato et al. | |
| 7,442,753 | B2 | 10/2008 | Tsubaki et al. | |
| 7,449,513 | B2 | 11/2008 | Sato et al. | |
| 7,498,364 | B2 | 3/2009 | Sato et al. | |
| 7,517,073 | B2 | 4/2009 | Nito et al. | |
| 7,517,074 | B2 | 4/2009 | Hakamada et al. | |
| 7,528,179 | B2 | 5/2009 | Suda et al. | |
| 7,538,147 | B2 | 5/2009 | Sato et al. | |
| 7,550,037 | B2 * | 6/2009 | Mafune et al. | 106/31.48 |
| 7,563,853 | B2 | 7/2009 | Tsubaki et al. | |
| 7,566,362 | B2 | 7/2009 | Mori et al. | |
| 7,572,844 | B2 | 8/2009 | Sato et al. | |
| 7,591,888 | B2 * | 9/2009 | Fujii et al. | 106/31.47 |
| 7,598,332 | B2 | 10/2009 | Ikegami et al. | |
| 7,601,790 | B2 | 10/2009 | Sato et al. | |
| 7,615,113 | B2 | 11/2009 | Aikawa et al. | |
| 7,629,427 | B2 | 12/2009 | Sato et al. | |
| 7,648,943 | B2 | 1/2010 | Fujiwara et al. | |
| 7,678,185 | B2 * | 3/2010 | Matsumoto et al. | 106/31.47 |
| 7,704,414 | B2 | 4/2010 | Sato et al. | |
| 7,705,071 | B2 | 4/2010 | Nakagawa et al. | |
| 7,771,525 | B2 | 8/2010 | Morita et al. | |
| 7,866,806 | B2 | 1/2011 | Sato et al. | |
| 7,883,199 | B2 | 2/2011 | Hakamada et al. | |
| 7,909,448 | B2 | 3/2011 | Iwata et al. | |
| 7,918,928 | B2 | 4/2011 | Saito et al. | |
| 8,013,051 | B2 | 9/2011 | Takada et al. | |
| 8,016,406 | B2 | 9/2011 | Hakamada et al. | |
| 8,029,612 | B2 * | 10/2011 | Ishii et al. | 106/31.48 |
| 8,101,011 | B2 * | 1/2012 | Tateishi et al. | 106/31.46 |
| 8,372,190 | B2 * | 2/2013 | Tateishi et al. | 106/31.52 |
| 8,389,600 | B2 | 3/2013 | Suzuki et al. | |
| 8,408,691 | B2 | 4/2013 | Koike et al. | |
| 8,425,027 | B2 | 4/2013 | Nishiwaki et al. | |
| 8,450,393 | B2 | 5/2013 | Tsubaki et al. | |
| 8,469,504 | B2 | 6/2013 | Saito et al. | |
| 8,585,781 | B2 | 11/2013 | Tateishi et al. | |
| 2005/0150420 | A1 * | 7/2005 | Takasaki et al. | 106/31.5 |
| 2007/0109376 | A1 * | 5/2007 | Tojo et al. | 106/31.48 |
| 2007/0263056 | A1 * | 11/2007 | Fukumoto et al. | 106/31.52 |
| 2008/0152827 | A1 | 6/2008 | Hakamada et al. | |
| 2010/0034972 | A1 | 2/2010 | Mukae et al. | |
| 2011/0310162 | A1 | 12/2011 | Tamanuki et al. | |
| 2012/0313997 | A1 | 12/2012 | Nakazawa et al. | |
| 2013/0139723 | A1 | 6/2013 | Tateishi et al. | |
| 2013/0139724 | A1 | 6/2013 | Tateishi et al. | |
| 2013/0271523 | A1 | 10/2013 | Sakai et al. | |
| 2013/0271540 | A1 | 10/2013 | Saito et al. | |
| 2013/0321523 | A1 * | 12/2013 | Yoshimoto et al. | 106/31.48 |
| 2014/0013997 | A1 * | 1/2014 | Nagata et al. | 106/31.48 |

FOREIGN PATENT DOCUMENTS

| | | |
|---|---|---|
| EP | 2096145 A1 | 9/2009 |
| JP | 2002-535432 A | 10/2002 |
| JP | 2003-231834 A | 8/2003 |
| JP | 2004-083903 A | 3/2004 |
| JP | 2004-323605 A | 11/2004 |
| JP | 2005-139427 A | 6/2005 |
| JP | 2006-143989 A | 6/2006 |
| JP | 2006-282795 A | 10/2006 |
| JP | 2012-177073 A | 9/2012 |
| JP | 2012-177074 A | 9/2012 |
| JP | 2012-177078 A | 9/2012 |
| JP | 2012-177079 A | 9/2012 |
| JP | 2012-193333 A | 10/2012 |
| JP | 2012-211293 A | 11/2012 |
| WO | 2004/104108 A1 | 12/2004 |
| WO | 2006/001274 A1 | 1/2006 |
| WO | 2006/082669 A1 | 8/2006 |
| WO | 2007/091631 A1 | 8/2007 |
| WO | 2008/053776 A1 | 5/2008 |
| WO | 2008/066062 A1 | 6/2008 |
| WO | 2012/014954 A1 | 2/2012 |
| WO | 2012/050061 A1 | 4/2012 |
| WO | 2012/081640 A1 | 6/2012 |
| WO | WO 2012/127758 * | 9/2012 |

OTHER PUBLICATIONS

Sep. 26, 2014 Chinese Official Action in Chinese Patent Appln. No. 201310398741.5.

* cited by examiner

INK, INK CARTRIDGE AND INK JET RECORDING METHOD

BACKGROUND OF THE INVENTION

1. Field of Invention

The present invention relates to an ink, an ink cartridge and an ink jet recording method.

2. Description of the Related Art

An ink jet recording method is such a recording method that minute droplets of an ink are applied to a recording medium such as plain paper to form an image, and is rapidly spread owing to low price of an apparatus itself and improvement of recording speed. In general, a recorded article obtained by the ink jet recording method is low in fastness properties of an image thereof compared with a silver salt photograph. In particular, when the recorded article is exposed to light, humidity, heat or environmental gas present in air, such as an ozone gas for a long period of time, there is a problem that a coloring material of the recorded article is deteriorated to easily cause change in color tone or fading of the image.

The fading of an image recorded using an ink having a hue of black involves color tone change due to the deterioration of a coloring material in many cases. For such a problem, various proposals have been made in which the use of an ink containing a coloring material having a structure excellent in ozone resistance improves the ozone resistance of an image. For example, a proposal is made on an ink in which the use of a compound having an easily associating molecular structure as a black coloring material enables recording an image improved in ozone resistance (see Japanese Patent Application Laid-Open No. 2005-139427 and International Publication No. WO 2012/014954).

As described in Japanese Patent Application Laid-Open No. 2005-139427 and International Publication No. WO 2012/014954, with respect to a coloring material (dye) having a novel structure, such a structural designing that the oxidation potential is raised by incorporation of an electron attracting group, and the coloring material is made to be hardly oxidized by suppression of electron transfer has been in the recent year's mainstream. However, a coloring material thus designed easily polarizes and easily associates. Therefore, although the ozone resistance of an image is improved, there is a problem in that the color tone change is liable to occur in the case where the associating state changes.

The change in the associating state of a coloring material occurs depending on the polarity of an ink, specifically, the dielectric constant of water, a water-soluble organic solvent and the like in the ink. In the ink jet recording method, it is usual in order to record an image having a desired color tone that a plurality of inks are superposingly applied to a recording medium. However, a water-soluble organic solvent contained in another ink superposingly applied exerts an influence on an easily associating coloring material to resultantly change the color tone, and an image having a desired color tone cannot resultantly be recorded in some cases. The color tone change is more easily visible in a neutral hue, that is, a region where a* and b* in the L*a*b* colorimetric system prescribed by CIE (Commission Internationale de l'Eclairage) are nearly zero. Therefore, the color tone change is an important problem in an ink containing a black coloring material.

Further in an ink containing a coloring material designed in an easily associating structure in order to raise the ozone resistance of an image, liquid components such as water evaporate from an ejection orifice of a recording head to resultantly concentrate the ink; such a peculiar problem that the coloring material is liable to cohere and the sticking resistance decreases resultantly arises.

Therefore, it is an object of the present invention to provide an ink which can record an image excellent in ozone resistance, suppressed in color tone change in an environment where various types of water-soluble organic solvents are present, and having a more uniform color tone, and is excellent in sticking resistance. It is another object of the present invention to provide an ink cartridge and an ink jet recording method using the ink.

SUMMARY OF THE INVENTION

The above objects are achieved by the following present invention. That is, the present invention provides an ink jet ink containing a first coloring material and a second coloring material, wherein the first coloring material is a black coloring material exhibiting a difference $\Delta\lambda_{max1}$ ($=\lambda_{maxD1}-\lambda_{maxW1}$) of 20.0 or more between a maximum absorption wavelength a ($\lambda_{maxD1}$) in a 20.0% by mass aqueous solution of 1,2-hexanediol and a maximum absorption wavelength ($\lambda_{maxW1}$) in water in a UV-Vis absorption spectrum; the second coloring material is a coloring material exhibiting a difference $\Delta\lambda_{max2}$ ($=\lambda_{maxD2}-\lambda_{maxW2}$) of 12.0 or less between a maximum absorption wavelength ($\lambda_{maxD2}$) in a 20.0% by mass aqueous solution of 1,2-hexanediol and a maximum absorption wavelength a ($\lambda_{maxW2}$) in water in a UV-Vis absorption spectrum; the sum of the $\Delta\lambda_{max1}$ and the $\Delta\lambda_{max2}$ is 35.0 or less; the second coloring material contains at least one selected from the group consisting of a compound represented by the following general formula (II), C.I. Food Black 2, a compound represented by the following general formula (III), C.I. Direct Blue 199, a compound represented by the following general formula (IV), a compound represented by the following general formula (V), C.I. Direct Red 227, C.I. Acid Red 289, a compound represented by the following general formula (VI), a compound represented by the following general formula (VII), C.I. Acid Red 249, C.I. Direct Yellow 132, C.I. Acid Yellow 23, C.I. Acid Yellow 17 and a compound represented by the following general formula (VIII); and the sum total of the content (% by mass) of the first coloring material and the content (% by mass) of the second coloring material in the ink is 6.0% by mass or less based on the total mass of the ink.

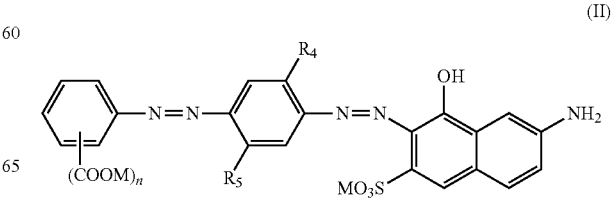

(II)

wherein in the general formula (II), $R_4$ and $R_5$ each independently represent an alkoxy group substituted with a hydroxy group and having 1 to 4 carbon atoms; n represents 1 to 3; and M each independently represents a hydrogen atom, an alkali metal, an ammonium or an organic ammonium.

(III)

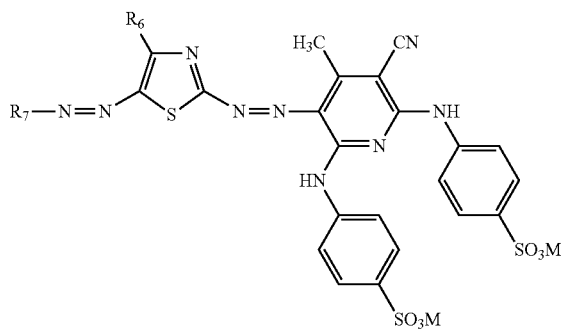

wherein in the general formula (III), $R_6$ and $R_7$ each independently represent an aryl group which may be substituted with an anionic group; and M each independently represents a hydrogen atom, an alkali metal, an ammonium or an organic ammonium.

(IV)

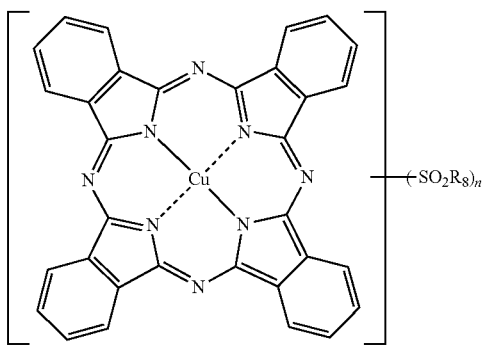

wherein in the general formula (IV), $R_8$ each independently represent an alkyl group having 1 to 4 carbon atoms, and the alkyl group may be substituted with an anionic group, a sulfonamide group, a hydroxy group, an alkyl group having 1 to 4 carbon atoms or a combined group of at least two thereof; and n represents 3 or 4.

wherein in the general formula (V), rings A, B, C and D indicated by broken lines each independently represent an aromatic ring or a heteroaromatic ring; $R_9$ represents an anilino group substituted with 1 to 3 anionic groups; $R_{10}$ represents an amino group or an alkoxy group having 1 to 4 carbon atoms; $R_{11}$ represents an alkylene group having 1 to 4 carbon atoms; M each independently represents a hydrogen atom, an alkali metal, an ammonium or an organic ammonium; and l represents 0 to 4, m represents 1 to 3, n represents 1 to 3, and l+m+n represents 1 to 4.

(VI)

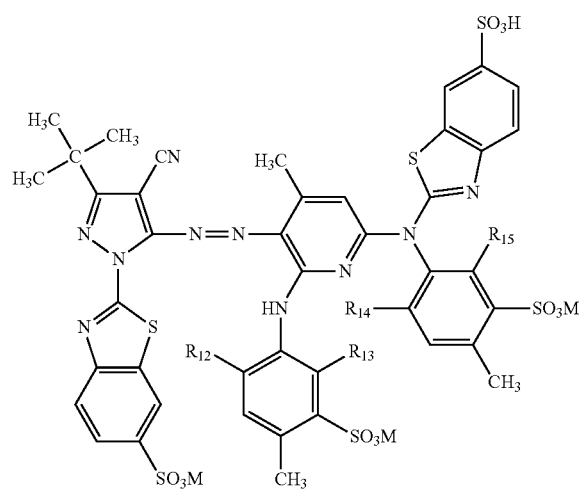

wherein in the general formula (VI), $R_{12}$, $R_{13}$, $R_{14}$ and $R_{15}$ each independently represent an alkyl group having 1 to 4 carbon atoms; and M each independently represents a hydrogen atom, an alkali metal, an ammonium or an organic ammonium.

(VII)

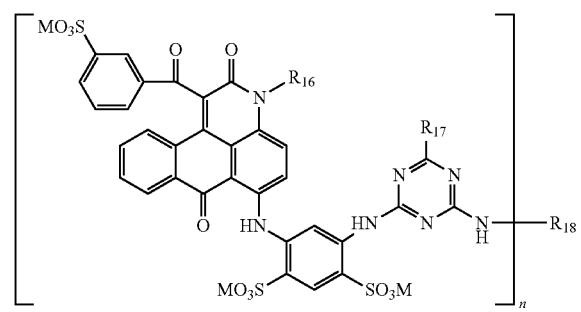

wherein in the general formula (VII), $R_{16}$ represents a hydrogen atom or an alkyl group having 1 to 4 carbon atoms; $R_{17}$ (V)

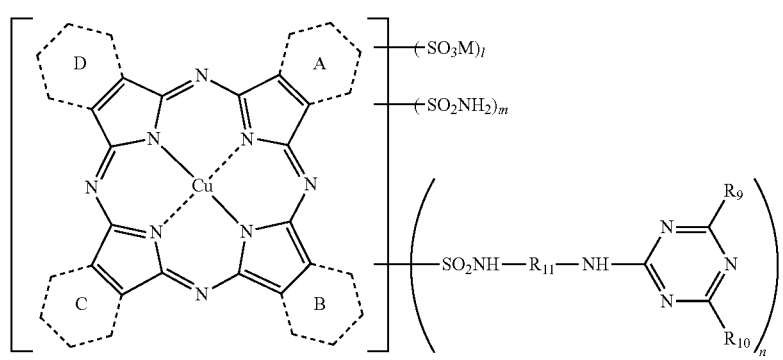

represents an aryloxy group substituted with 1 to 3 anionic groups, or a hydroxy group; n represents 1 or 2; when n=1, $R_{18}$ represents an aryl group substituted with 1 to 3 anionic groups, and when n=2, $R_{18}$ represents an alkylene group having 1 to 4 carbon atoms; and M each independently represents a hydrogen atom, an alkali metal, an ammonium or an organic ammonium.

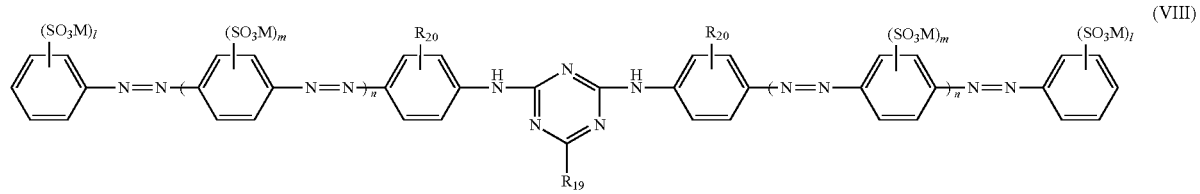

wherein in the general formula (VIII), $R_{19}$ represents an aliphatic amine residue having an anionic group and having 1 to 4 carbon atoms; $R_{20}$ each independently represents a hydrogen atom, an alkyl group having 1 to 4 carbon atoms, or an alkoxy group having 1 to 4 carbon atoms, and the alkyl group and the alkoxy group may be substituted with an anionic group; n represents 0 or 1; M each independently represents a hydrogen atom, an alkali metal, an ammonium or an organic ammonium; and l and m each independently represent 1 or 2.

The present invention can provide an ink which can record an image excellent in ozone resistance, suppressed in color tone change in an environment where various types of water-soluble organic solvents are present, and having a more uniform color tone, and is excellent in sticking resistance. The present invention can also provide an ink cartridge and an ink jet recording method using the ink.

Further features of the present invention will become apparent from the following description of exemplary embodiments with reference to the attached drawings.

BRIEF DESCRIPTION OF THE DRAWINGS

FIGS. 2A and 2B schematically illustrate an exemplary ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Preferred embodiments of the present invention will now be described in detail in accordance with the accompanying drawings. Incidentally, when a compound is a salt, the salt present in an ink in a state of being dissociated into ions. In the present invention, however, this is referred to as "containing a salt" for the sake of convenience. An ink jet ink is simply referred to as "ink" in some cases. In the present invention, values of various types of physical properties are the values at 25° C.

The first coloring material contained in the ink according to the present invention is a coloring material improved in ozone resistance by making molecules capable of being easily associated. The association of molecules is generally caused by the ionic bond, the dipole-dipole interaction, and the intermolecular force such as the van del Waals force. In the case where a coloring material is utilized as a coloring material incorporated in an ink, it is most preferable from the viewpoint of the balance in the association capability and the cohesion suppression in the ink that molecules are caused to associate by utilizing the dipole-dipole interaction. The dipole-dipole interaction refers to a phenomenon in which in the case where a plurality of atoms having different electronegativities are bonded, charges are caused to be deviated (polarized) among these atoms, and because of the polarization the molecules electrostatically attracts each other.

Figure 3:
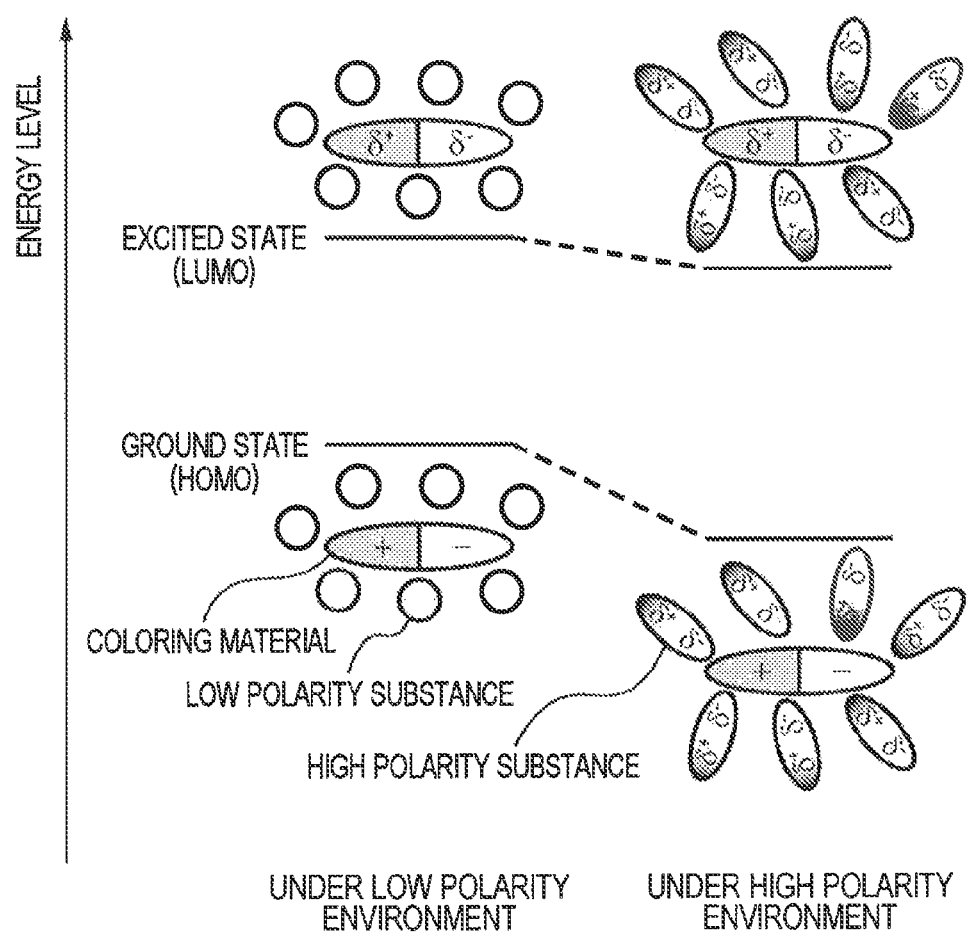
FIG. 3 is a conceptual diagram schematically illustrating energy levels of a coloring material under low polarity environment and under high polarity environment.

The ground state (HOMO) of a coloring material causing polarization receives an influence of the dielectric constant of a substance present in the surrounding in some cases. As illustrated in FIG. 3, for example, under high polarity environment (the case where a high-dielectric constant substance is present), the polarization of a coloring material is stabilized. Therefore, the energy level in the ground state (HOMO) under high polarity environment is sometimes likely to remarkably decrease as compared with the energy level in the ground state (HOMO) under low polarity environment (the case where a low-dielectric constant substance is present). By contrast, in the excited state (LUMO) of the coloring material causing polarization, since electrons flow in the opposite direction to the polarization, that is, to the direction of weakening the polarization, a state of a low polarization emerges. Therefore, the energy levels in the excited state (LUMO) are not likely to be affected by a substance present in the surrounding as compared to the energy levels in the ground state (HOMO), and the energy levels in the excited state (LUMO) are not so different between under high polarity environment and under low polarity environment. Therefore, the first coloring material thus intramolecularly polarized causes a difference in the band gap of HOMO-LUMO between under high polarity environment and under low polarity environment, and causes color tone change. This phenomenon is called solvatochromism. In the case of using such a first coloring material for an ink, the maximum absorption wavelength of the coloring material shits depending on the placing environment (difference in the dielectric constant of a substance present in the surrounding) of the coloring material, and color tone change is resultantly caused.

As a result of studies to solve the abovementioned problems, the present inventors have found an ink constitution capable of recording an image suppressed in color tone change even under an environment where various types of water-soluble organic solvents are present. The first coloring material used for the ink according to the present invention is a black coloring material having an easily associating molecular structure in order to increase the ozone resistance of an image. One index to indicate easiness of association of molecules of the black coloring material includes some high magnitude of the difference $\Delta\lambda_{max}$ in maximum absorption wavelength between under low and high polarity environments. In the present invention, together with such a first coloring material, a second coloring material, whose difference $\Delta\lambda_{max}$ in maximum absorption wavelength between under low and high polarity environments is small (whose maximum absorption wavelength does not shift so much), or whose maximum absorption wavelength shifts to the opposite direction to the first coloring material, is incorporated in the ink. An ink can thereby be provided in which the shift of the maximum absorption wavelength is small or cancelled even under an environment where the ink is combined with other inks and various types of water-soluble organic solvents are present, and which can record an image holding uniform color tone.

Specifically, the ink according to the present invention contains a first coloring material and a second coloring material satisfying the following conditions. The first coloring material is a black coloring material exhibiting a difference $\Delta\lambda_{max1}$ $(=\lambda_{maxD1}-\lambda_{maxW1})$ of 20.0 or more between a maximum absorption wavelength $(\lambda_{maxD1})$ in a 20.0% by mass aqueous solution of 1,2-hexanediol and a maximum absorption wavelength $(\lambda_{maxW1})$ in water. The second coloring material is a coloring material exhibiting a difference $\Delta\lambda_{max2}$ $(=\lambda_{maxD2}-\lambda_{maxW2})$ of 12.0 or less between a maximum absorption wavelength $(\lambda_{maxD2})$ in a 20.0% by mass aqueous solution of 1,2-hexanediol and a maximum absorption wavelength $(\lambda_{maxW2})$ in water. Further, the sum of the $\Delta\lambda_{max1}$ and the $\Delta\lambda_{max2}$ needs to be 35.0 or less. $\lambda_{max}$ refers to a maximum absorption wavelength in the visible region (380 to 750 nm) in a UV-Vis absorption spectrum of a coloring material, and can be measured using a spectrophotometer.

If $\Delta\lambda_{max1}$ of a first coloring material is less than 20.0, since the polarization of the molecule is low, the association capability is low and the ozone resistance of a recorded image is insufficient. If $\Delta\lambda_{max2}$ of a second coloring material is more than 12.0, the absorption wavelength shifts in the same direction as the first coloring material, and largely shifts. Therefore, the color tone change due to water-soluble organic solvents contained in other inks cannot be suppressed. Further if $\Delta\lambda_{max2}$ is more than 12.0, the polarization of the molecule of the second coloring material becomes high as in the first coloring material. In an image recorded with an ink containing such a second coloring material, the second coloring material is liable to be adsorbed to cationic components (alumina, its hydrate, cationic resins, fillers and the like) contained in a recording medium. Therefore, the second coloring material is liable to fix on the surface of and in the vicinity of the surface of the recording medium. Since the further permeation of the ink in the recording medium is resultantly suppressed, such a state that the ink overflows on the surface of the recording medium, that is, the bronzing phenomenon, is liable to be caused in some cases. If the sum of $\Delta\lambda_{max1}$ and $\Delta\lambda_{max2}$ is more than 35.0, the color tone change due to water-soluble organic solvents contained in other inks cannot be suppressed. In order to remarkably suppress the color tone change due to water-soluble organic solvents contained in other inks, it is especially preferable that $\Delta\lambda_{max2}$ of the second coloring material is 0.0 or less, and the sum of $\Delta\lambda_{max1}$ and $\Delta\lambda_{max2}$ is 20.0 or less.

In a coloring material in which an associating state and a non-associating state are concurrently present, the absorption spectrum has a plurality of maximal-absorption wavelengths in some cases. Then, respective peak shapes (heights) at the maximal-absorption wavelengths representing the associating state and the non-associating state vary depending on a liquid medium to be used in some cases. The maximum absorption wavelength in the present invention means the following. That is, even in the case where a maximum absorption wavelength in an absorption spectrum in 20.0% by mass aqueous solution of 1,2-hexanediol shifts based on an absorption spectrum in water, a peak originated from a maximum absorption wavelength in water is taken as the maximum absorption wavelength. Hereinafter, an example of a coloring material will be described, which exhibits two maximal-absorptions in the visible region, exhibits, in water, the highest absorbance of a peak present on a larger wavelength side, and exhibits, in 20.0% by mass aqueous solution of 1,2-hexanediol, the highest absorbance of a peak present on a smaller wavelength side. In the present invention, since it is important to consider the shift of a wavelength giving a highest absorbance, a maximum absorption wavelength in 20.0% by mass aqueous solution of 1,2-hexanediol is considered to be a maximal-absorption wavelength on a larger wavelength side, which is a peak originated from a maximum absorption wavelength in water.

In the present invention, a maximum absorption wavelength is measured using water (ion-exchange water and deionized water are suitable) and a 20.0% by mass aqueous solution of 1,2-hexanediol as liquid media for diluting a coloring material and using a spectrophotometer. This is on the assumption of an upper limit and a lower limit of dielectric constants of solvents suitably usable for inks suitable for aqueous ink jet. That is, this can be said to represent a width in dielectric constants (polarities) possibly influencing coloring materials when an image is recorded by superposing the ink with other inks. In the ink according to the present invention, coloring materials exhibiting the color tone change in the range of the dielectric constants of water and a 20.0% by mass aqueous solution of 1,2-hexanediol can be used especially suitably.

The first coloring material is a coloring material having a structure designed so as to increase the association capability by raising the polarization of the molecule in order to increase the ozone resistance of an image. In an ink containing a coloring material having a high association capability, a peculiar problem arises in that if liquid components such as water evaporate from an ejection orifice of a recording head and the ink is concentrated, the coloring material becomes liable to cohere and the sticking resistance decreases. In the ink according to the present invention, a specific coloring material needs to be concurrently used in addition to a first coloring material in order to suppress the color tone change due to water-soluble organic solvents contained in other inks. In the case of an ink further containing a second coloring material in addition to a first coloring material having a large $\Delta\lambda_{max1}$ in such a manner, the coloring materials particularly become liable to cohere and the sticking resistance remarkably becomes liable to decrease. Therefore, in the present invention, the sum total of the content of the first coloring material and the content of the second coloring material needs to be suppressed in 6.0% by mass or less. If the sum total is more than 6.0% by mass, sticking is liable to be caused; in order to carry out normal recording, the recovery (cleaning) operation of an ink jet recording apparatus needs to be carried out in a large number of times, thus giving insufficient sticking resistance.

<Ink>

Hereinafter, each component constituting the ink according to the present invention will be described in detail.

First Coloring Material

The first coloring material is a black coloring material exhibiting a difference $\Delta\lambda_{max1}$ ($=\lambda_{maxD1}-\lambda_{maxW1}$) of 20.0 or more between a maximum absorption wavelength ($\lambda_{maxD1}$) in a 20.0% by mass aqueous solution of 1,2-hexanediol and a maximum absorption wavelength ($\lambda_{maxW1}$) in water. If $\Delta\lambda_{max1}$ is less than 20.0, the ozone resistance of a recorded image is insufficient. In order to sufficiently suppress the color tone change due to water-soluble organic solvents contained in other inks, the upper limit of $\Delta\lambda_{max1}$ can be 30.0 or less.

As described above, the first coloring material is a coloring material improved in the ozone resistance by making the molecules easily associate. It cannot be generally said, but compounds having an unshared electron pair such as a carbonyl group and heteroaromatic rings or compounds having a plurality of unshared electron pairs which are conjugated easily associate, and $\Delta\lambda_{max1}$ is likely to be 20.0 or more. For example, since in a heteroaromatic ring, a nitrogen atom or a sulfur atom has an unshared electron pair, the heteroaromatic ring has a higher electronegativity than a benzene ring, and causes a deviation in the charge. In the case where a plurality of unshared electron pairs are conjugated, the polarization is caused conceivably by transfer of the unshared electron pairs through the conjugate.

A black coloring material in the present invention refers to a coloring material exhibiting an absolute value of each of a* and b* of 35 or less, as measured for an aqueous solution in which the coloring material is diluted 20,000 to 40,000 times (in terms of mass) with water by using a spectrophotometer under the condition of a visual field of 2° and a light source of 'C'.

A specific example suitable for the first coloring material includes a compound represented by the following general formula (I). The compound represented by the general formula (I) is a black coloring material satisfying the above condition. Therefore, a compound represented by the general formula (I) is especially preferable because of being excellent in ozone resistance and being excellent also in the stability of the compound. A specific example of the compound represented by the general formula (I) is described in International Publication No. WO 2012/014954. Specific examples of substituents will be described later.

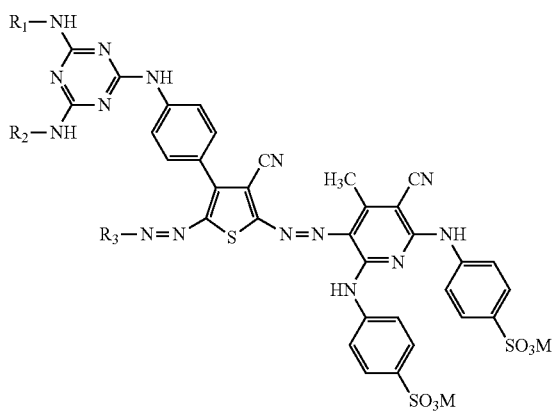

(I)

wherein in the general formula (I), $R_1$ and $R_2$ each independently represent an alkyl group having 1 to 4 carbon atoms or an aryl group which may be substituted with an anionic group; $R_3$ represents an aryl group, and the aryl group may be substituted with a cyano group or an anionic group; and M each independently represents a hydrogen atom, an alkali metal, an ammonium or an organic ammonium.

Second Coloring Material

The second coloring material is a coloring material exhibiting a difference $\Delta\lambda_{max2}$ ($=\lambda_{maxD2}-\lambda_{maxW2}$) of 12.0 or less between a maximum absorption wavelength ($\lambda_{maxD2}$) in a 20.0% by mass aqueous solution of 1,2-hexanediol and a maximum absorption wavelength ($\lambda_{maxW2}$) in water. As the second coloring material, in order to suppress the color tone change caused by use of a first coloring material exhibiting the solvatochromism phenomenon without spoiling the ozone resistance of an image due to the first coloring material, a coloring material selected from a specific group described below needs to be used. The specific group consists of a compound represented by the following general formula (II), C.I. Food Black 2, a compound represented by the following general formula (III), C.I. Direct Blue 199, a compound represented by the following general formula (IV), a compound represented by the following general formula (V), C.I. Direct Red 227, C.I. Acid Red 289, a compound represented by the following general formula (VI), a compound represented by the following general formula (VII), C.I. Acid Red 249, C.I. Direct Yellow 132, C.I. Acid Yellow 23, C.I. Acid Yellow 17 and a compound represented by the following general formula (VIII).

Figure 4:
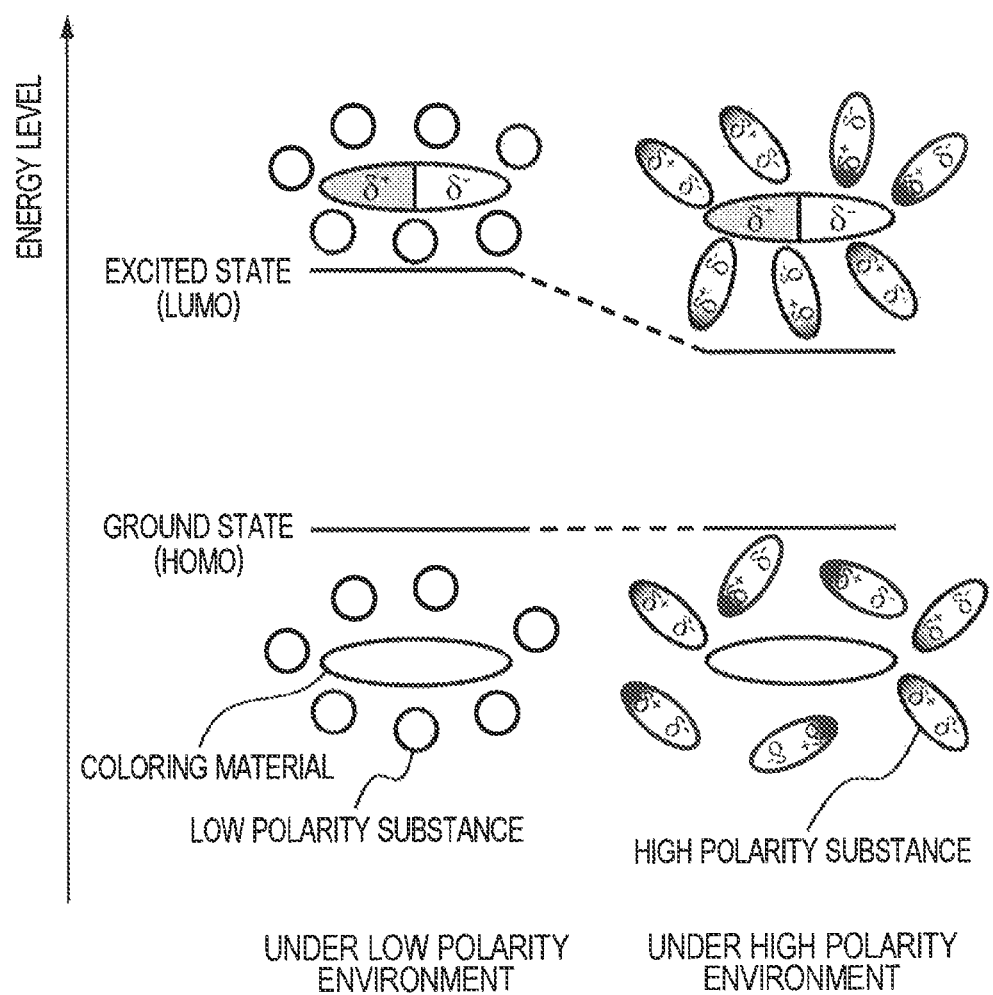
FIG. 4 is a conceptual diagram schematically illustrating energy levels of a coloring material under low polarity environment and under high polarity environment.

If $\Delta\lambda_{max2}$ of the second coloring material is more than 12.0, the color tone change due to water-soluble organic solvents contained in other inks cannot be suppressed and the bronzing resistance of a recorded image becomes insufficient. In order to sufficiently suppress the color tone change due to water-soluble organic solvents contained in other inks, the lower limit of $\Delta\lambda_{max2}$ can be −15.0 or more, and the upper limit of $\Delta\lambda_{max2}$ can be 0.0 or less. It cannot generally be said, but a compound in the molecular structure of which an aromatic ring having no heteroatom such as a benzene ring or a naphthalene ring is present in the vicinity of a structural part contributing to color development is likely to exhibit $\Delta\lambda_{max2}$ of 0.0 or less. The compound exhibiting $\Delta\lambda_{max2}$ of 0.0 or less is a compound stabilized in the excited state (LUMO) under high polarity environment as illustrated in FIG. 4.

No particular limitation is imposed on the hue of a second coloring material, which may be any hue of black, cyan, magenta, yellow, red, green, blue and the like. In order to adjust a slight tint of a first coloring material being a black coloring material to be more neutral, at least one color coloring material can be used.

Specific examples of second coloring materials with given C.I. numbers include C.I. Food Black 2, C.I. Direct Blue 199, C.I. Direct Red 227, C.I. Acid Red 289, C.I. Acid Red 249, C.I. Direct Yellow 132, C.I. Acid Yellow 23 and C.I. Acid Yellow 17. These are each a coloring material satisfying $\Delta\lambda_{max2}$ of 12.0 or less.

Specific examples of black coloring materials include compounds having the following structures in addition to the above black coloring material with a given C.I. number. A specific example of a compound represented by the general formula (II) is described in National Publication of International Patent Application No. 2002-535432, and a specific example of a compound represented by the general formula (III) is described in Japanese Patent Application Laid-Open No. 2005-139427.

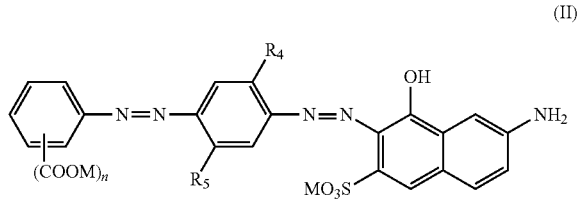

(II)

wherein in the general formula (II), $R_4$ and $R_5$ each independently represent an alkoxy group substituted with a hydroxy group and having 1 to 4 carbon atoms; n represents 1 to 3; and M each independently represents a hydrogen atom, an alkali metal, an ammonium or an organic ammonium.

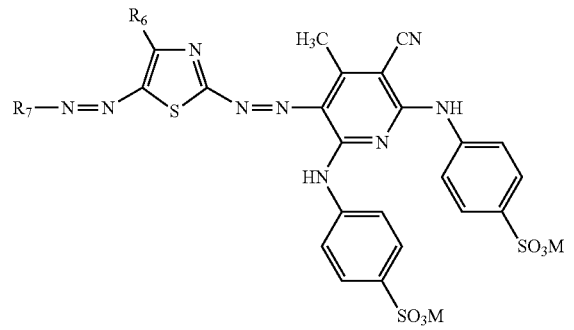

(III)

wherein in the general formula (III), $R_6$ and $R_7$ each independently represent an aryl group which may be substituted with an anionic group; and M each independently represents a hydrogen atom, an alkali metal, an ammonium or an organic ammonium.

Specific examples of cyan coloring materials include compounds having the following structures in addition to the above cyan coloring material with a given C.I. number. A specific example of a compound represented by the general formula (IV) is described in Japanese Patent Application Laid-Open No. 2003-231834, and specific examples of compounds represented by the general formula (V) are described in Japanese Patent Application Laid-Open No. 2004-323605 and International Publication Nos. WO 2007/091631 and WO 2012/050061.

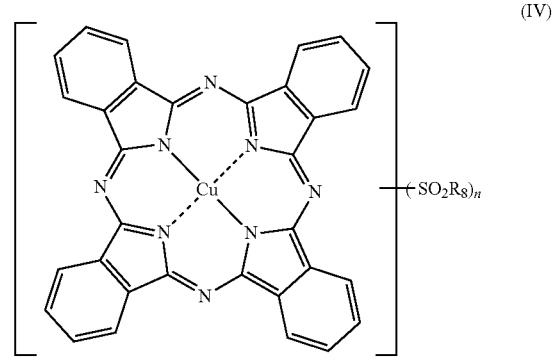

(IV)

wherein in the general formula (IV), $R_8$ each independently represent an alkyl group having 1 to 4 carbon atoms, and the alkyl group may be substituted with an anionic group, a sulfonamide group, a hydroxy group, an alkyl group having 1 to 4 carbon atoms or a combined group of at least two thereof; and n represents 3 or 4.

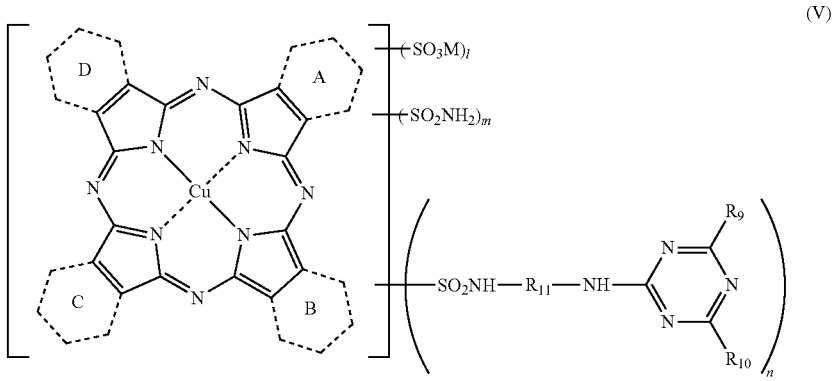

(V)

wherein in the general formula (V), rings A, B, C and D indicated by broken lines each independently represent an aromatic ring or a heteroaromatic ring; $R_9$ represents an anilino group substituted with 1 to 3 anionic groups; $R_{10}$ represents an amino group or an alkoxy group having 1 to 4 carbon atoms; $R_{11}$ represents an alkylene group having 1 to 4 carbon atoms; M each independently represents a hydrogen atom, an alkali metal, an ammonium or an organic ammonium; and l represents 0 to 4, m represents 1 to 3, n represents 1 to 3, and 1+m+n represents 1 to 4.

Specific examples of magenta coloring materials include compounds having the following structures in addition to the above magenta coloring materials with given C.I. numbers. A specific example of a compound represented by the general formula (VI) is described in Japanese Patent Application Laid-Open No. 2006-143989, and specific examples of compounds represented by the general formula (VII) are described in International Publication Nos. WO 2004/104108 and WO 2008/066062.

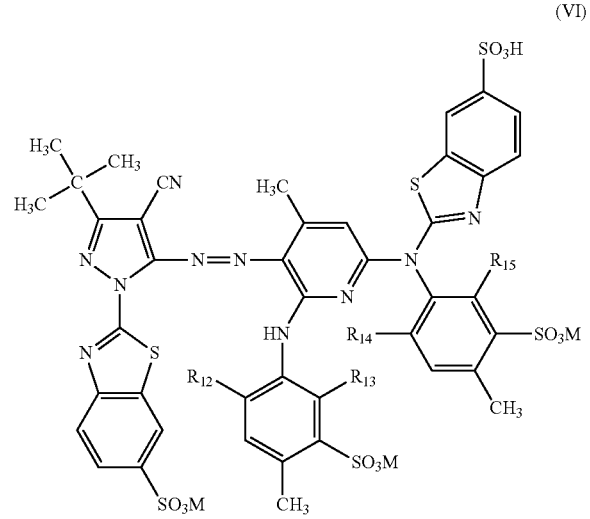

(VI)

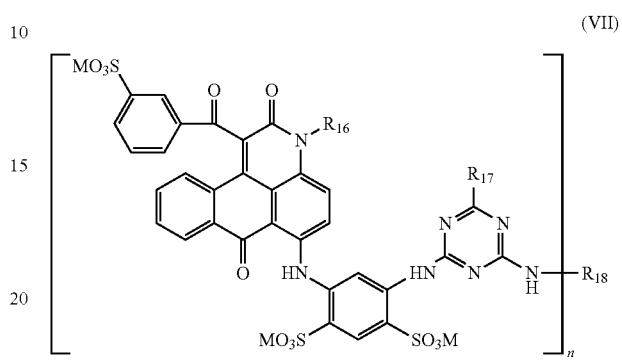

(VII)

wherein in the general formula (VI), $R_{12}$, $R_{13}$, $R_{14}$ and $R_{15}$ each independently represent an alkyl group having 1 to 4 carbon atoms; and M each independently represents a hydrogen atom, an alkali metal, an ammonium or an organic ammonium.

wherein in the general formula (VII), $R_{16}$ represents a hydrogen atom or an alkyl group having 1 to 4 carbon atoms; $R_{17}$ represents an aryloxy group substituted with 1 to 3 anionic groups, or a hydroxy group; n represents 1 or 2; when n=1, $R_{18}$ represents an aryl group substituted with 1 to 3 anionic groups, and when n=2, $R_{18}$ represents an alkylene group having 1 to 4 carbon atoms; and M each independently represents a hydrogen atom, an alkali metal, an ammonium or an organic ammonium.

Specific examples of yellow coloring materials include compounds having the following structures in addition to the above yellow coloring materials with given C.I. numbers. Specific examples of compounds represented by the general formula (VIII) are described in International Publication Nos. WO 2006/001274 and WO 2008/053776.

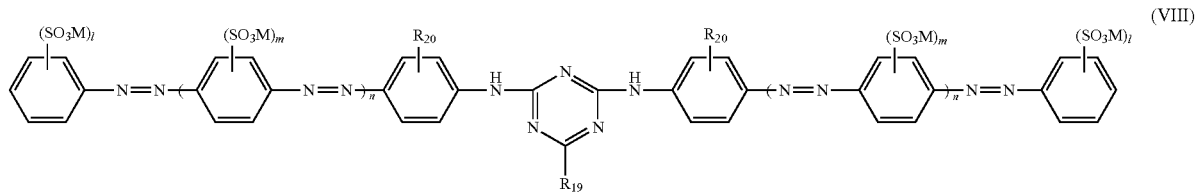

(VIII)

wherein in the general formula (VIII), $R_{19}$ represents an aliphatic amine residue having an anionic group and having 1 to 4 carbon atoms; $R_{20}$ each independently represents a hydrogen atom, an alkyl group having 1 to 4 carbon atoms, or an alkoxy group having 1 to 4 carbon atoms, and the alkyl group and the alkoxy group may be substituted with an anionic group; n represents 0 or 1; M each independently represents a hydrogen atom, an alkali metal, an ammonium or an organic ammonium; and l and m each independently represent 1 or 2.

Specific examples of substituents in the general formulae (I) to (VIII) cited as specific examples suitable for the first coloring material and the second coloring material are as follows. Alkyl groups having 1 to 4 carbon atoms include a methyl group, an ethyl group, a n-propyl group, an i-propyl group, a n-butyl group and a t-butyl group. Alkoxy groups having 1 to 4 carbon atoms include a methoxy group, an ethoxy group, a propoxy group and a butoxy group. Alkylene groups having 1 to 4 carbon atoms include a methylene group, an ethylene group, a propylene group and a butylene group. Aryl groups include a phenyl group and a naphthyl group. Aryloxy groups include a phenoxy group and a naphthoxy group.

Anionic groups include a carboxy group, a sulfonic acid group, a phosphoric acid group and a phosphoric acid group, and these anionic groups may be either of a free acid form and a salt form. A counterion (M) of the anionic group has the same meaning as M in each general formula, and is a hydrogen atom, an alkali metal, an ammonium or an organic ammonium. The alkali metal includes sodium, lithium and potassium. The organic ammonium includes alkylamines having 1 or more and 3 or less carbon atoms such as methylamine and ethylamine, and mono-, di- or trialkanolamines having 1 or more and 4 or less carbon atoms such as monoethanolamine, diethanolamine, triethanolamine, monoisopropanolamine, diisopropanolamine and triisopropanolamine.

Among the above second coloring materials, a second coloring material can be at least one selected from the group consisting of a compound represented by the general formula (II), C.I. Food Black 2, C.I. Direct Blue 199, a compound represented by the general formula (IV), a compound represented by the general formula (V), C.I. Direct Red 227, C.I. Acid Red 289, a compound represented by the general formula (VI), a compound represented by the general formula (VII), C.I. Acid Red 249, C.I. Acid Yellow 23, C.I. Acid Yellow 17 and a compound represented by the general formula (VIII). In the present invention, as the second coloring material, a coloring material exhibiting $\Delta\lambda_{max2}$ of 0.0 or less can be used as described above. Such a second coloring material includes a compound represented by the above general formula (III), C.I. Acid Red 249 and a compound represented by the above general formula (VIII). Above all, the compound represented by the above general formula (VIII) is suitable because the compound can particularly adjust a slight tint of a first coloring material being a black coloring material to be neutral. Especially a compound is suitable which is represented by the general formula (VIII) in which $R_{19}$ is —NH—CH$_2$CH$_2$—SO$_3$M (M represents a hydrogen atom, an alkali metal, an ammonium or an organic ammonium).

Other Coloring Materials

Other coloring materials (third coloring materials) other than the first coloring material and the second coloring material may be further incorporated in an ink unless the advantage of the present invention is not spoiled. Presence of a third coloring material may give a case where the sum of $\Delta\lambda_{max}$ is more than 35.0. However, a case where a third coloring material is added in the case where a combination of two types of coloring materials satisfies the requirement of the present invention can obviously more suppress the color tone change than a case where the third coloring material is added in the case where a combination of two types of coloring materials does not satisfy the requirement of the present invention. However, in the case of using one or more third coloring materials, the content thereof can be equal to or less than the content of a first coloring material or a second coloring material, and is more preferably less than the content of the second coloring material. In the case of using one or more third coloring materials, the sum total of contents of coloring materials in an ink can be 1.0% by mass or more and 6.0% by mass or less based on the total mass of the ink. The sum ($\Delta\lambda_{max1}+\Delta\lambda_{max2}+\Delta\lambda_{max3}+\dots$) of $\Delta\lambda_{max}$ of all coloring materials in the ink is especially preferably 35.0 or less. Here, $\Delta\lambda_{max3}$ is a value defined as in $\Delta\lambda_{max1}$ and $\Delta\lambda_{max2}$.

Contents of Coloring Materials

The ink according to the present invention can be inks having color tones of gray to black. The color tones of gray to black in the present invention mean color tones which are not chromatic colors such as cyan, magenta and yellow, that is, achromatic colors, and does not care about lightness. That is, the ink according to the present invention can be made to be a black ink (dark ink), a gray ink (light ink) and further a light gray ink. Therefore, in order to adjust color tones of inks from gray to black, the content of a second coloring material in the ink can be less than the content of a first coloring material being a black coloring material. More specifically, the content (% by mass) of a first coloring material can be 1.0 or more times and 10.0 or less times the content (% by mass) of a second coloring material in terms of mass ratio based on the total mass of the ink.

The content (% by mass) of a first coloring material in an ink can be 0.1% by mass or more and 5.9% by mass or less based on the total mass of the ink. The content (% by mass) of a second coloring material in the ink can be 0.1% by mass or more and 5.9% by mass or less based on the total mass of the ink. The sum total of the content (% by mass) of the first coloring material and the content (% by mass) of the second coloring material in the ink needs to be 6.0% by mass or less based on the total mass of the ink. If the sum total of the contents is more than 6.0% by mass, the sticking resistance of the ink becomes insufficient. The sum total of the content (% by mass) of the first coloring material and the content (% by mass) of the second coloring material in the ink can be 0.5% by mass or more, and is more preferably 1.0% by mass or more.

Aqueous Medium

An aqueous solvent that is water or a mixed solvent of water and a water-soluble organic solvent may be used in the ink according to the present invention. The ink according to the present invention can be an aqueous ink containing at least water as an aqueous medium. Deionized water (ion-exchanged water) is favorably used as the water. The content (% by mass) of water in the ink is favorably 10.0% by mass or more and 90.0% by mass or less based on the total mass of the ink.

No particular limitation is imposed on the water-soluble organic solvent so far as the solvent is soluble in water, alcohols, polyglycols, glycol ethers, nitrogen-containing polar solvents and sulfur-containing polar solvents may be used. As the water-soluble organic solvent, a water-soluble organic solvent having a vapor pressure at normal temperature (25° C.) less than that of water can be used. The content (% by mass) of the water-soluble organic solvent in the ink is favorably 5.0% by mass or more and 90.0% by mass or less, more favorably 10.0% by mass or more and 50.0% by mass or less, based on the total mass of the ink. Here, the content of the water-soluble organic solvent is a value including contents of glycerin, a first water-soluble organic solvent and a second water-soluble organic solvent, which can be used according to needs. If the content of the water-soluble organic solvent is below or beyond the above-described range, the ejection stability of the resulting ink may not be sufficiently achieved at a high level in some cases.

Glycerin

The ink according to the present invention can further contain glycerin. The incorporation of glycerin enables improving the humidity resistance of a recorded image. The reason for the improvement in the humidity resistance of an image by the incorporation of glycerin will be described. The first coloring material has such a property that the color tone easily changes depending on the polarity of an ink. If an image recorded with the ink containing the first coloring material is allowed to stand under high humidity environment, the first coloring material, and moisture in the air, which is a high-polarity substance, contacts with each other to be thereby liable to discolor the image and to decrease the humidity resistance. Therefore, incorporation of a high-polarity water-soluble organic solvent like glycerin in an ink makes the color tone of the first coloring material in an image recorded with the ink to become a color tone under high polarity environment. That is, since the color tone of the first coloring material in an ink containing glycerin has already become a color tone under high polarity environment, even if the first coloring material contacts with moisture under high humidity environment, the degree of discoloration is low. The content (% by mass) of glycerin in an ink can be 1.0% by mass or more and 30.0% by mass or less, and is more preferably 2.0% by mass or more and 20.0% by mass or less, based on the total mass of the ink.

First Water-Soluble Organic Solvent, Second Water-Soluble Organic Solvent

The ink according to the present invention can contain, together with glycerin, a water-soluble organic solvent having a relatively lower polarity than glycerin so as to be in a predetermined mass ratio to the content of glycerin. First, Log Pow as an index to indicate the polarity of a water-soluble organic solvent will be described. Log Pow refers to a partition coefficient of water and octanol (1-octanol). Log Pow is a physical property value relevant to affinity of an object substance for water, and a higher value thereof means a lower polarity. Log Pow is calculated by the relational expression: Log Pow=$\text{Log}_{10}C_o/C_w$ ($C_o$ represents a concentration of an object substance in an octanol phase, and $C_w$ represents a concentration of the object substance in a water phase). Log Pow also can be empirically determined by a method prescribed in JIS Z 7260-107. Log Pow also can be determined utilizing commercially available calculation software such as trade name "ACD/PhysChem Suite" (made by ACD/Labs). In Examples described later, values were employed which were determined using trade name "ACD/PhysChem Suite Version 12.00" (made by ACD/Labs). Log Pow values of various types of water-soluble organic solvents are shown in Table 1.

TABLE 1

Log Pow Values of Water-Soluble Organic Solvents

| Water-Soluble Organic Solvents | Log Pow Value | Classification |
| --- | --- | --- |
| glycerin | −1.85 | — |
| triethylene glycol | −1.65 | first |
| diethylene glycol | −1.41 | first |
| 1,2,6-hexanetriol | −1.39 | first |
| ethylene glycol | −1.36 | first |
| 2-pyrrolidone | −1.09 | first |
| 1,2-propanediol | −1.01 | first |
| 1,4-butanediol | −0.77 | first |
| γ-butyrolactone | −0.63 | first |
| 1,5-pentanediol | −0.56 | first |
| 3-methyl-1,5-pentanediol | −0.21 | first |
| 1,6-hexanediol | −0.05 | first |
| triethylene glycol monobutyl ether | 0.36 | second |

TABLE 1-continued

Log Pow Values of Water-Soluble Organic Solvents

| Water-Soluble Organic Solvents | Log Pow Value | Classification |
| --- | --- | --- |
| 1,2-hexanediol | 0.52 | second |
| ethylene glycol monobutyl ether | 0.83 | second |

The ink according to the present invention satisfying at least one of the following condition A and condition B, and the following condition C can especially remarkably improve the humidity resistance and the bronzing resistance of a recorded image, which is therefore preferable.

Condition A: the ink contains a first water-soluble organic solvent having a Log Pow value of −1.8 or more and less than 0.0, and the content (% by mass) of the first water-soluble organic solvent is 0.3 times or more and 6.0 times or less the content (% by mass) of the glycerin in terms of mass ratio based on the total mass of the ink.

Condition B: the ink contains a second water-soluble organic solvent having a Log Pow value of 0.0 or more and 0.9 or less, and the content (% by mass) of the second water-soluble organic solvent is 0.2 times or more and 1.0 times or less the content (% by mass) of the glycerin in terms of mass ratio based on the total mass of the ink.

Condition C: the content (% by mass) of a water-soluble organic solvent having a Log Pow value of −1.8 or more and 0.9 or less is 0.2 times or more and 6.0 times or less the content (% by mass) of the glycerin in terms of mass ratio based on the total mass of the ink.

An image recorded using an ink containing a first coloring material and glycerin is excellent in the humidity resistance as described before. However, under high polarity environment in which glycerin is present, since the polarization of the first coloring material is stabilized, the polarization becomes higher. In an image recorded by applying such an ink to a recording medium, the first coloring material is liable to be adsorbed to cationic components (alumina, its hydrate, cationic resins, fillers and the like) contained in the recording medium. Since the polarization of the first coloring material is high, the association is remarkably promoted and the first coloring material is liable to fix on the surface of or in the vicinity of the surface of the recording medium. Since further permeation of the ink in the recording medium is resultantly suppressed, such a state that the ink overflows on the surface of the recording medium, that is, the bronzing phenomenon, is liable to be caused in some cases. That is, in the case where glycerin is present in an ink containing a first coloring material, since the humidity resistance and the bronzing resistance of an image recorded with the ink are in an opposite relation, these properties can be said to be difficult to satisfy in high levels. As a result of further studies in consideration of such a problem, the present inventors have found that satisfaction of at least one of the above condition A and condition B, and the condition C reasonably decreases the polarity of the ink. It has also been found that the reasonable suppression of the polarization of the first coloring material and the association of the first coloring material based thereon enables improving the bronzing resistance while satisfying the humidity resistance.

In the present invention, the first water-soluble organic solvent can be a compound having a hydroxy group on each of both terminals of the main chain thereof and having 4 to 6 atoms of the main chain between the two hydroxy groups. Use of such a compound as a first water-soluble organic solvent can provide the humidity resistance and the bronzing resistance in especially high levels. As described before, a first coloring material is in a state of a high polarization under high polarity environment such as the case where glycerin is present. If a compound having a hydroxy group on each of both terminals of the main chain thereof and having 4 to 6 atoms of the main chain between the two hydroxy groups is used as a first water-soluble organic solvent, the first coloring material and the first water-soluble organic solvent associate through the hydroxy groups. The polarization state of the first coloring material is thereby stabilized. The first coloring material whose polarization state has been stabilized exhibits excellent humidity resistance because of holding a color tone as if being under high polarity environment, due to the presence of the above compound. Additionally, it is conceivable that since the association of the first coloring material themselves is suppressed due to the association of the first coloring material and the above compound, the bronzing phenomenon is suppressed.

Here, the main chain means a longest carbon chain (in which di- or higher valent atoms may be interposed between carbon atoms) of a compound, and the number of atoms of the main chain is the number of atoms excluding the hydroxy groups. Describing diethylene glycol as an example, the main chain is —C—C—O—C—C—, and the number of atoms of the main chain is 5. Specific examples of a compound having a hydroxy group on each of both terminals of the main chain thereof and having 4 to 6 atoms of the main chain between the two hydroxy groups, which is a preferable example of the first water-soluble organic solvent, include diethylene glycol, 1,4-butanediol, 1,5-pentanediol, 3-methyl-1,5-pentanediol and 1,6-hexanediol.

Other Additives

The ink according to the present invention may contain a water-soluble organic compound which is solid at ordinary temperature, such as a polyhydric alcohol such as trimethylolpropane or trimethylolethane, urea or a derivative thereof, in addition to the above-described components as needed. In addition, the ink according to the present invention may also contain various additives such as a surfactant, a pH adjustor, a rust preventive, a preservative, a mildewproofing agent, an antioxidant, an anti-reducing agent, an evaporation accelerator, a chelating agent and a water-soluble polymer as needed.

Other Inks

In order to record a full-color image, the ink according to the present invention may be used in combination with other inks having a hue different from the ink according to the present invention. As examples of the other inks, may be mentioned at least one ink selected from the group consisting of black, cyan, magenta, yellow, red, green and blue inks. What is called a light color ink having substantially the same hue as such an ink may also be further used in combination. Coloring materials used in the other inks and light color ink may be publicly known dyes or newly synthesized dyes.

Ink Cartridge

Figure 1:
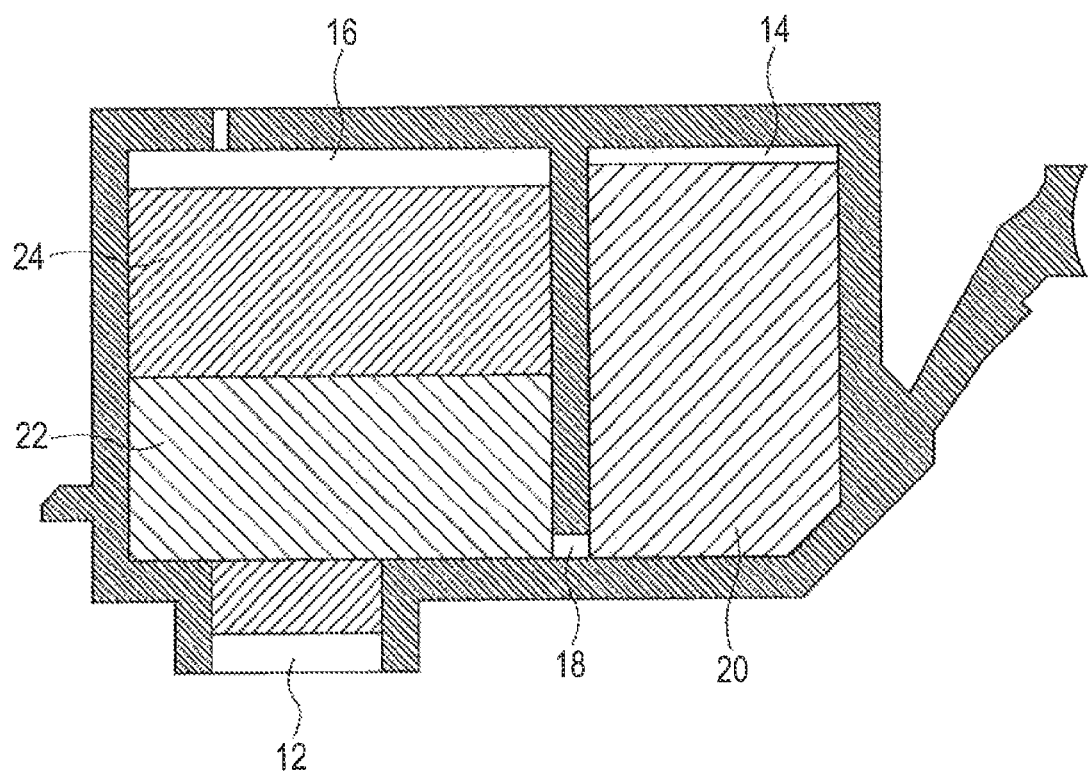
FIG. 1 is a sectional view schematically illustrating an ink cartridge according to an embodiment of the present invention.

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
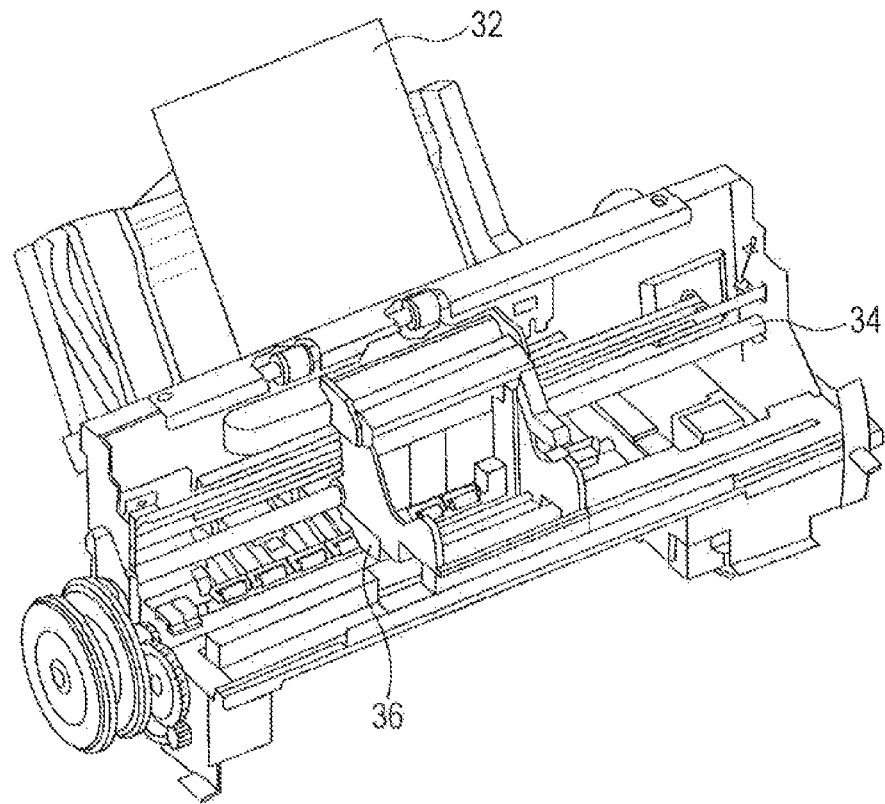
Figure 2B:
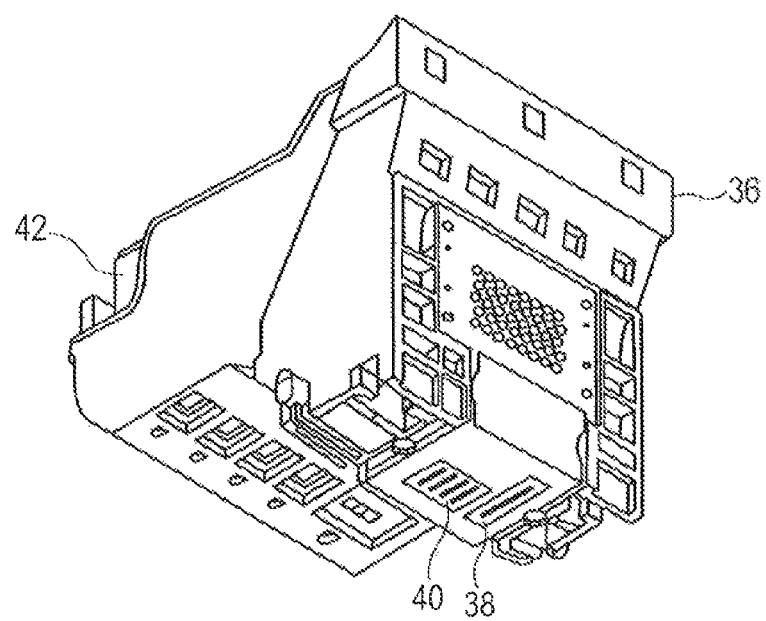

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

Examples

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components described below are based on mass unless expressly noted.

<Preparation of Coloring Materials>

Black Coloring Material 1

A mixture of a lithium salt and a sodium salt (80%:20%) of a compound (black coloring material 1) in a free acid form represented by the following formula was synthesized by reference to the description of International Publication No. WO 2012/014954.

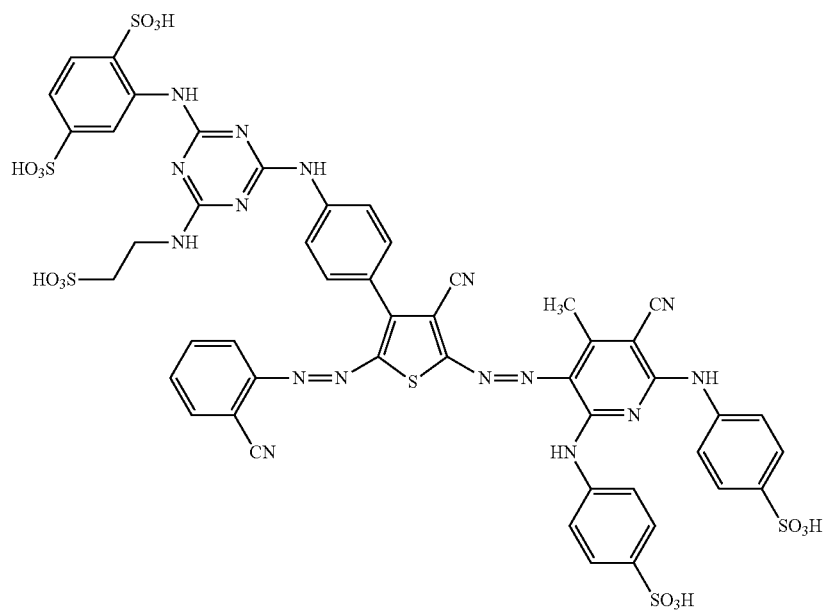 [SMILES: Cc1c(C#N)c(Nc2ccc(S(=O)(=O)O)cc2)nc(Nc2ccc(S(=O)(=O)O)cc2)c1N=Nc1sc(N=Nc2ccccc2C#N)c(-c2ccc(Nc3nc(NCCS(=O)(=O)O)nc(Nc4cc(S(=O)(=O)O)ccc4S(=O)(=O)O)n3)cc2)c1C#N]

25

Black Coloring Material 2

A mixture of a lithium salt and a sodium salt (80%:20%) of a compound (black coloring material 2) in a free acid form represented by the following formula was synthesized by reference to the description of International Publication No. WO 2012/081640.

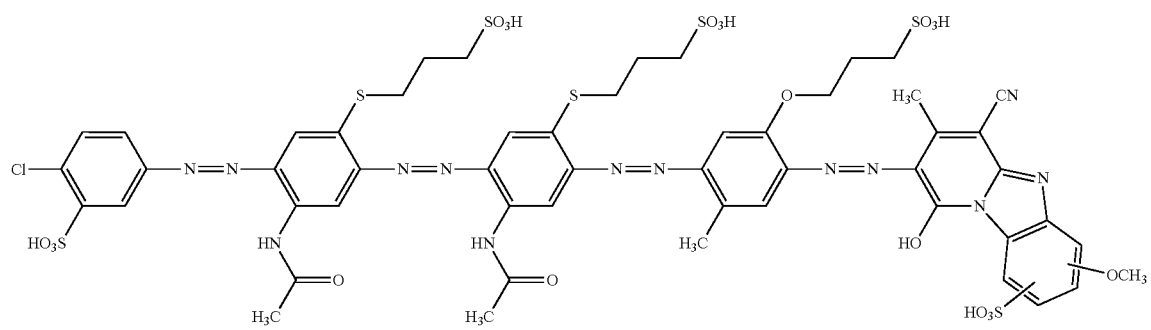

Black Coloring Material 3

A sodium salt of a compound (black coloring material 3) in a free acid form represented by the following formula was synthesized by reference to the description of National Publication of International Patent Application No. 2002-535432.

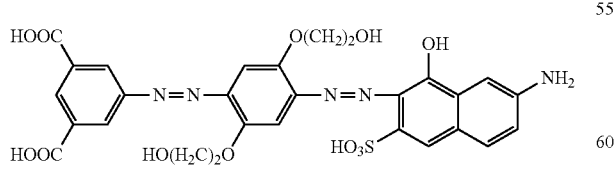

Black Coloring Material 4

A lithium salt of a compound (black coloring material 4) in a free acid form represented by the following formula was synthesized by reference to the description of Japanese Patent Application Laid-Open No. 2005-139427.

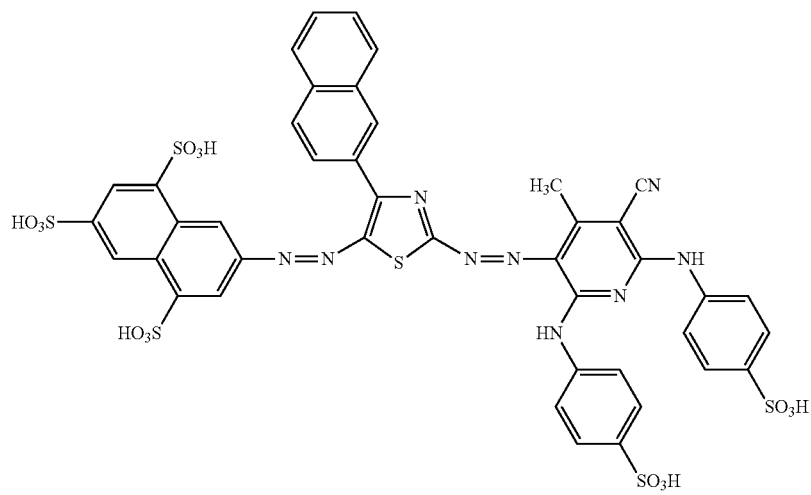 [SMILES: Cc1c(C#N)c(Nc2ccc(S(=O)(=O)O)cc2)nc(Nc2ccc(S(=O)(=O)O)cc2)c1N=Nc1nc(-c2ccc3ccccc3c2)c(N=Nc2cc(S(=O)(=O)O)c3cc(S(=O)(=O)O)cc(S(=O)(=O)O)c3c2)s1]

Cyan Coloring Material 1

A lithium salt of a compound (cyan coloring material 1) in a free acid form represented by the following formula was synthesized by reference to the description of Japanese Patent Application Laid-Open No. 2003-231834.

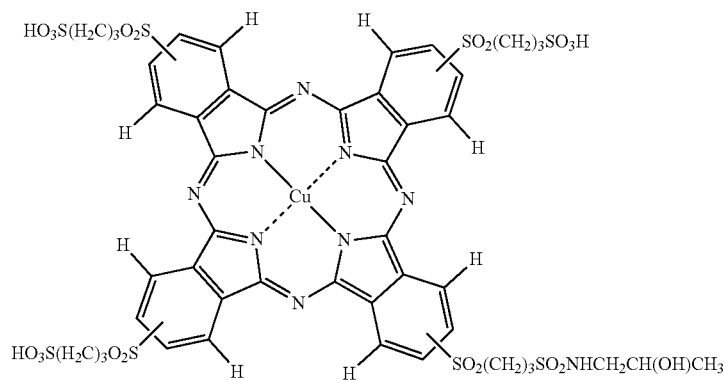

Cyan Coloring Material 2

A sodium salt of a compound (cyan coloring material 2) in a free acid form represented by the following formula was synthesized by reference to the description of Japanese Patent Application Laid-Open No. 2004-323605.

Cyan Coloring Material 3

A sodium salt of a compound (cyan coloring material 3) in a free acid form represented by the following formula was synthesized by reference to the description of International Publication No. WO 2007/091631.

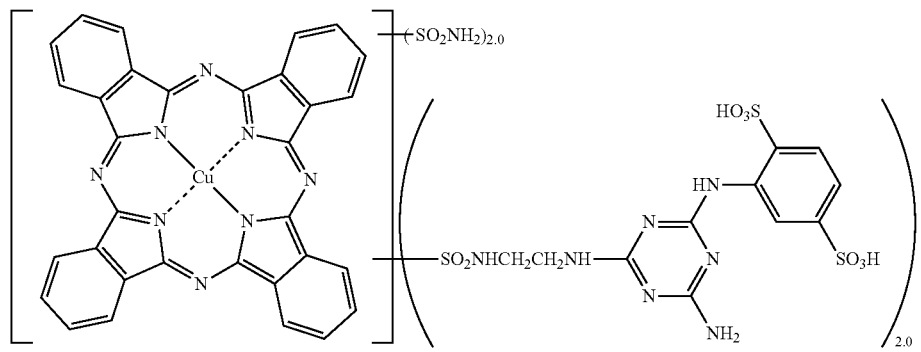

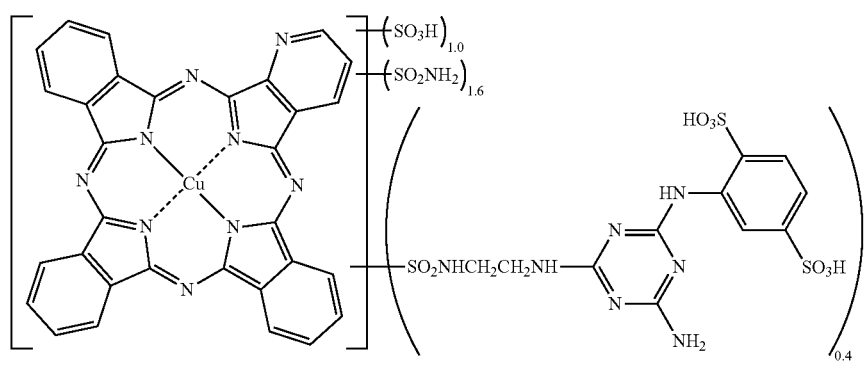

Magenta Coloring Material 1

A lithium salt of a compound (magenta coloring material 1) in a free acid form represented by the following formula was synthesized by reference to the description of Japanese Patent Application Laid-Open No. 2006-143989.

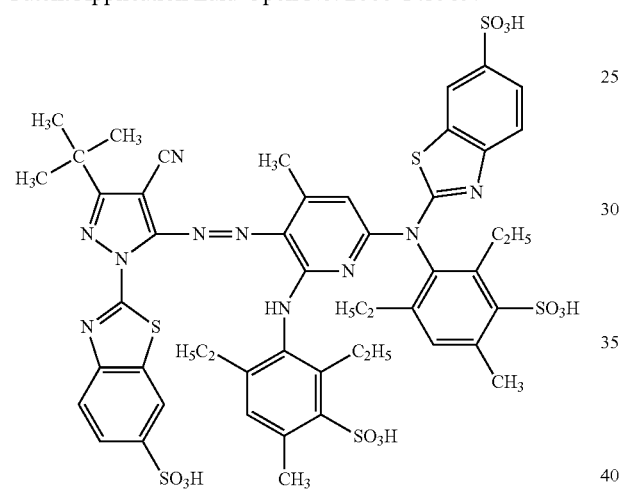

Magenta Coloring Material 2

A sodium salt of a compound (magenta coloring material 2) in a free acid form represented by the following formula was synthesized by reference to the description of International Publication No. WO 2008-066062.

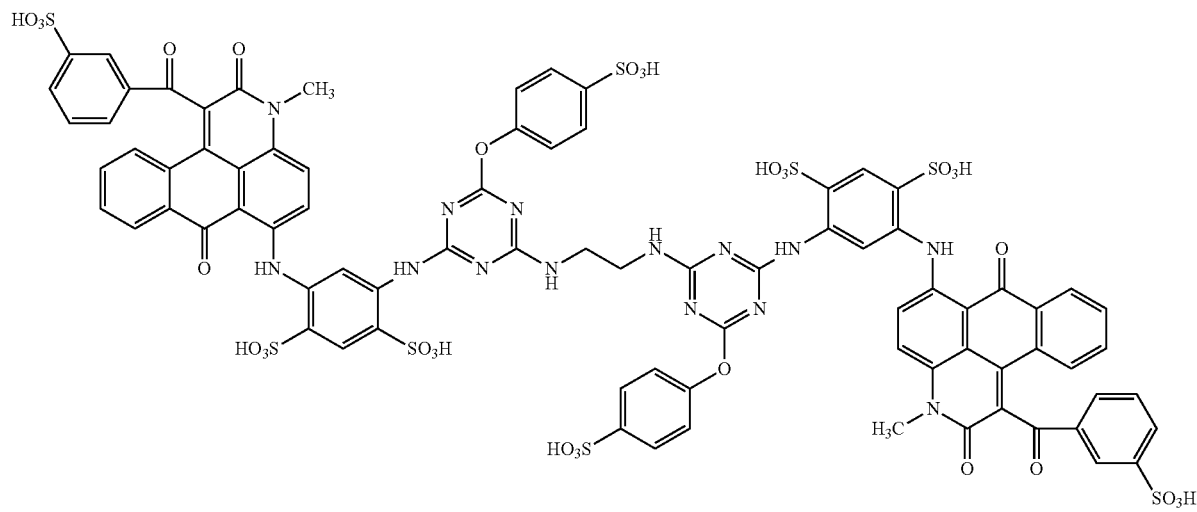 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7ccc(S(=O)(=O)O)cc7)n6)nc(Oc6ccc(S(=O)(=O)O)cc6)n5)c(S(=O)(=O)O)cc4S(=O)(=O)O)ccc31)C(=O)c1ccccc1-2]

Yellow Coloring Material 1

A potassium salt of a compound (yellow coloring material 1) in a free acid form represented by the following formula was synthesized by reference to the description of Japanese Patent Application Laid-Open No. 2004-083903.

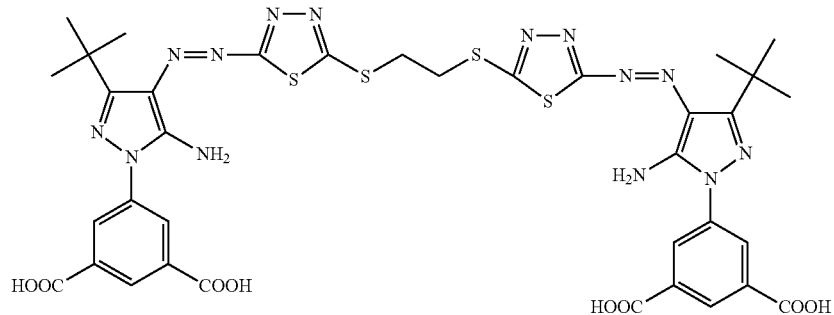 [SMILES: CC(C)(C)c1nn(-c2cc(C(=O)O)cc(C(=O)O)c2)c(N)c1N=Nc1nnc(SCCSc2nnc(N=Nc3c(C(C)(C)C)nn(-c4cc(C(=O)O)cc(C(=O)O)c4)c3N)s2)s1]

Yellow Coloring Material 2

A potassium salt of a compound (yellow coloring material 2) in a free acid form represented by the following formula was synthesized by reference to the description of International Publication No. WO 2006/082669.

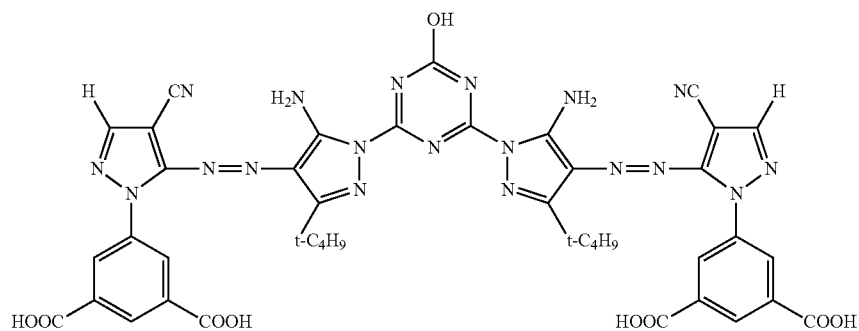

Yellow Coloring Material 3

A sodium salt of a compound (yellow coloring material 3) in a free acid form represented by the following formula was synthesized by reference to the description of International Publication No. WO 2006/001274.

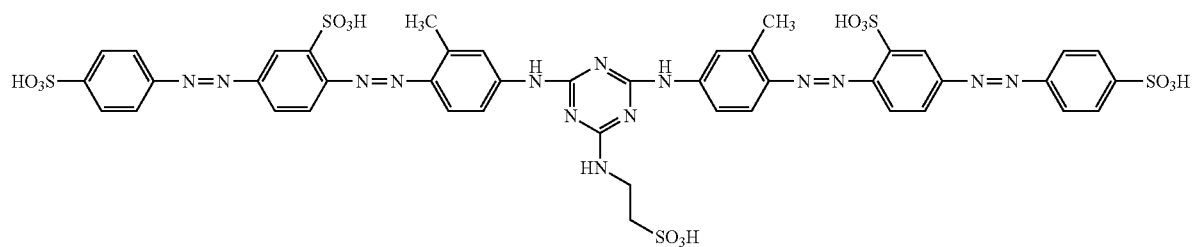 [SMILES: Cc1cc(Nc2nc(NCCS(=O)(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O]

Yellow Coloring Material 4

A sodium salt of a compound (yellow coloring material 4) in a free acid form represented by the following formula was synthesized by reference to the description of International Publication No. WO 2008/053776.

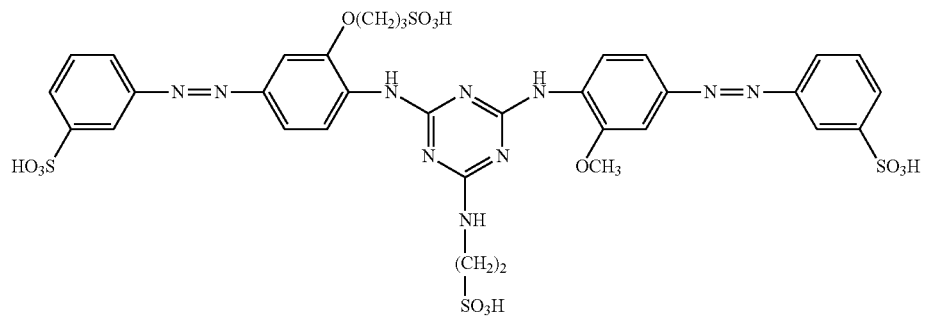

<Measurement of $\Delta\lambda_{max}$>

For each coloring material, the difference $\Delta\lambda_{max}$ ($=\lambda_{maxD}-\lambda_{maxW}$) between a maximum absorption wavelength ($\lambda_{maxD}$) in a 20.0% by mass aqueous solution of 1,2-hexanediol and a maximum absorption wavelength ($\lambda_{maxW}$) in water in UV-Vis absorption spectra was measured. $\lambda_{maxD}$ and $\lambda_{maxW}$ were measured by diluting each coloring material by using a 20.0% by mass aqueous solution of 1,2-hexanediol or ion-exchange water so that the content of the coloring material became 0.002 to 0.005%. The measurement condition is shown below. Then, the value $\Delta\lambda_{max}=\lambda_{maxD}-\lambda_{maxW}$ was determined from the measurement. The results are shown in Table 2. Here, the unit of $\lambda_{max}$ is "nm."

Spectrophotometer: a self-recording spectrophotometer (trade name "U-3300," made by Hitachi, Ltd.)
   Measurement cell: 1-cm quartz cell
   Sampling interval: 0.1 nm
   Scanning speed: 30 nm/min

TABLE 2

$\Delta\lambda_{max}$ Values of Coloring Materials

| | $\lambda_{maxD}$ | $\lambda_{maxW}$ | $\Delta\lambda_{max}$ |
|---|---|---|---|
| black coloring material 1 | 630.5 | 605.5 | 25.0 |
| black coloring material 2 | 608.0 | 590.0 | 18.0 |
| black coloring material 3 | 585.5 | 573.5 | 12.0 |
| C.I. Food Black 2 | 595.0 | 585.5 | 9.5 |
| black coloring material 4 | 604.0 | 604.0 | 0.0 |
| cyan coloring material 1 | 629.5 | 623.0 | 6.5 |
| cyan coloring material 2 | 611.0 | 608.5 | 2.5 |
| cyan coloring material 3 | 602.5 | 601.0 | 1.5 |
| magenta coloring material 1 | 559.5 | 555.0 | 4.5 |
| magenta coloring material 2 | 512.0 | 508.5 | 3.5 |
| C.I. Acid Red 249 | 520.0 | 524.0 | −4.0 |
| yellow coloring material 1 | 451.5 | 427.5 | 24.0 |
| C.I. Direct Yellow 86 | 399.0 | 380.0 | 19.0 |
| yellow coloring material 2 | 453.0 | 434.5 | 18.5 |
| C.I. Direct Yellow 132 | 411.0 | 405.5 | 5.5 |
| C.I. Acid Yellow 23 | 430.5 | 427.0 | 3.5 |
| yellow coloring material 3 | 408.0 | 417.0 | −9.0 |
| yellow coloring material 4 | 382.0 | 391.5 | −9.5 |

Preparation of Inks

After the respective components (unit: %) shown in upper parts of Tables 3-1 to 3-5 and Tables 4-1 to 4-4 were mixed and sufficiently stirred, the resultant respective mixtures were filtered under pressure through a filter having a pore size of 0.20 μm, thereby preparing respective inks.

Here, "Acetylenol E100" in Tables 3-1 to 3-5 and Tables 4-1 to 4-4 is a trade name of a nonionic surfactant (made by Kawaken Fine Chemicals Co., Ltd.). A numerical value in parentheses attached to a coloring material name is a value of $\Delta\lambda_{max}$. In lower parts of Tables 3-1 to 3-5 and Tables 4-1 to 4-4, values (nm) $\Delta\lambda_{max1}+\Delta\lambda_{max2}$ of combinations of first coloring materials and second coloring materials used in preparation of inks are shown. In lower parts of Tables 4-1 to 4-4, mass ratios of contents (%) of first water-soluble organic solvents to contents (%) of glycerin are shown as "first solvent/glycerin." Mass ratios of contents (%) of second water-soluble organic solvents to contents (%) of glycerin are further shown as "second solvent/glycerin." Mass ratios of contents (%) of water-soluble organic solvents having a Log Pow value of −1.8 or more and 0.9 or less to contents (%) of glycerin are further shown as "specific solvent/glycerin."

Examples and Comparative Examples shown in Tables 3-1 to 3-5 were constituted of the two ink compositions having different polarities. The polarities of the inks were made different by properly using 1,2-hexanediol, which is a water-soluble organic solvent having a low dielectric constant, and glycerin, which is a water-soluble organic solvent having a high dielectric constant. Specifically, compositions (H) using glycerin were used to thereby make the polarity of the ink relatively high, and compositions (L) using 1,2-hexanediol was used to thereby make the polarity of the ink relatively low. For Examples and Comparative Examples shown in Tables 3-1 to 3-5, color tones were evaluated by utilizing the compositions (H) and the compositions (L); and ozone resistances were evaluated by utilizing the compositions (L). The evaluation results of the color tones and the ozone resistances are shown in Table 5. Examples and Comparative Examples shown in Tables 4-1 to 4-4 utilized some of combinations of the coloring materials shown in Tables 3-1 to 3-5, and used different ink compositions. For Examples and Comparative Examples shown in Tables 4-1 to 4-4, the humidity resistances and the bronzing resistances were evaluated. The evaluation results of the humidity resistances and the bronzing resistances are shown in Table 6.

TABLE 3-1

Compositions of Inks

| Compositions | Ex 1 H | Ex 1 L | Ex 2 H | Ex 2 L | Ex 3 H | Ex 3 L | Ex 4 H | Ex 4 L | Ex 5 H | Ex 5 L | Ex 6 H | Ex 6 L |
|---|---|---|---|---|---|---|---|---|---|---|---|---|
| black coloring material 1 (25.0) | 3.0 | 3.0 | 3.0 | 3.0 | 3.0 | 3.0 | 3.0 | 3.0 | 3.0 | 3.0 | 3.0 | 3.0 |
| black coloring material 2 (18.0) | | | | | | | | | | | | |
| black coloring material 3 (12.0) | | | | | | | | | | | | |
| C.I. Food Black 2 (9.5) | 0.5 | 0.5 | | | | | | | | | | |
| black coloring material 4 (0.0) | | | 0.5 | 0.5 | | | | | | | | |
| cyan coloring material 1 (6.5) | | | | | 0.5 | 0.5 | | | | | | |
| cyan coloring material 2 (2.5) | | | | | | | 0.5 | 0.5 | | | | |
| cyan coloring material 3 (1.5) | | | | | | | | | 0.5 | 0.5 | | |
| magenta coloring material 1 (4.5) | | | | | | | | | | | 0.5 | 0.5 |
| magenta coloring material 2 (3.5) | | | | | | | | | | | | |
| C.I. Acid Red 249 (−4.0) | | | | | | | | | | | | |
| yellow coloring material 1 (24.0) | | | | | | | | | | | | |
| C.I. Direct Yellow 86 (19.0) | | | | | | | | | | | | |
| yellow coloring material 2 (18.5) | | | | | | | | | | | | |
| C.I. Direct Yellow 132 (5.5) | | | | | | | | | | | | |
| C.I. Acid Yellow 23 (3.5) | | | | | | | | | | | | |
| yellow coloring material 3 (−9.0) | | | | | | | | | | | | |
| yellow coloring material 4 (−9.5) | | | | | | | | | | | | |
| glycerin | 20.0 | | 20.0 | | 20.0 | | 20.0 | | 20.0 | | 20.0 | |
| 1,2-hexanediol | | 20.0 | | 20.0 | | 20.0 | | 20.0 | | 20.0 | | 20.0 |
| Acetylenol E100 | 0.4 | 0.4 | 0.4 | 0.4 | 0.4 | 0.4 | 0.4 | 0.4 | 0.4 | 0.4 | 0.4 | 0.4 |
| ion-exchange water | 76.1 | 76.1 | 76.1 | 76.1 | 76.1 | 76.1 | 76.1 | 76.1 | 76.1 | 76.1 | 76.1 | 76.1 |
| $\Delta\lambda_{max1} + \Delta\lambda_{max2}$ | 34.5 | | 25.0 | | 31.5 | | 27.5 | | 26.5 | | 29.5 | |

TABLE 3-2

Compositions of Inks

| Compositions | Ex 7 H | Ex 7 L | Ex 8 H | Ex 8 L | Ex 9 H | Ex 9 L | Ex 10 H | Ex 10 L | Ex 11 H | Ex 11 L | Ex 12 H | Ex 12 L |
|---|---|---|---|---|---|---|---|---|---|---|---|---|
| black coloring material 1 (25.0) | 3.0 | 3.0 | 3.0 | 3.0 | 3.0 | 3.0 | 3.0 | 3.0 | 3.0 | 3.0 | 3.0 | 3.0 |
| black coloring material 2 (18.0) | | | | | | | | | | | | |
| black coloring material 3 (12.0) | | | | | | | | | | | | |
| C.I. Food Black 2 (9.5) | | | | | | | | | | | | |
| black coloring material 4 (0.0) | | | | | | | | | | | | |
| cyan coloring material 1 (6.5) | | | | | | | | | | | | |
| cyan coloring material 2 (2.5) | | | | | | | | | | | | |
| cyan coloring material 3 (1.5) | | | | | | | | | | | | |
| magenta coloring material 1 (4.5) | | | | | | | | | | | | |
| magenta coloring material 2 (3.5) | 0.5 | 0.5 | | | | | | | | | | |
| C.I. Acid Red 249 (−4.0) | | | 0.5 | 0.5 | | | | | | | | |
| yellow coloring material 1 (24.0) | | | | | | | | | | | | |
| C.I. Direct Yellow 86 (19.0) | | | | | | | | | | | | |
| yellow coloring material 2 (18.5) | | | | | | | | | | | | |
| C.I. Direct Yellow 132 (5.5) | | | | | 0.5 | 0.5 | | | | | | |
| C.I. Acid Yellow 23 (3.5) | | | | | | | 0.5 | 0.5 | | | | |
| yellow coloring material 3 (−9.0) | | | | | | | | | 0.5 | 0.5 | | |
| yellow coloring material 4 (−9.5) | | | | | | | | | | | 0.5 | 0.5 |
| glycerin | 20.0 | | 20.0 | | 20.0 | | 20.0 | | 20.0 | | 20.0 | |
| 1,2-hexanediol | | 20.0 | | 20.0 | | 20.0 | | 20.0 | | 20.0 | | 20.0 |
| Acetylenol E100 | 0.4 | 0.4 | 0.4 | 0.4 | 0.4 | 0.4 | 0.4 | 0.4 | 0.4 | 0.4 | 0.4 | 0.4 |
| ion-exchange water | 76.1 | 76.1 | 76.1 | 76.1 | 76.1 | 76.1 | 76.1 | 76.1 | 76.1 | 76.1 | 76.1 | 76.1 |
| $\Delta\lambda_{max1} + \Delta\lambda_{max2}$ | 28.5 | | 21.0 | | 30.5 | | 28.5 | | 16.0 | | 15.5 | |

TABLE 3-3

| Compositions | Comparative Examples | | | | | | | | | | | |
|---|---|---|---|---|---|---|---|---|---|---|---|---|
| | 1 | | 2 | | 3 | | 4 | | 5 | | 6 | |
| | H | L | H | L | H | L | H | L | H | L | H | L |
| black coloring material 1 (25.0) | 3.0 | 3.0 | 3.0 | 3.0 | 3.0 | 3.0 | 3.0 | 3.0 | 3.0 | 3.0 | | |
| black coloring material 2 (18.0) | | | | | | | | | | | 3.0 | 3.0 |
| black coloring material 3 (12.0) | | | 0.5 | 0.5 | | | | | | | | |
| C.I. Food Black 2 (9.5) | | | | | | | | | | | | |
| black coloring material 4 (0.0) | | | | | | | | | | | 0.5 | 0.5 |
| cyan coloring material 1 (6.5) | | | | | | | | | | | | |
| cyan coloring material 2 (2.5) | | | | | | | | | | | | |
| cyan coloring material 3 (1.5) | | | | | | | | | | | | |
| magenta coloring material 1 (4.5) | | | | | | | | | | | | |
| magenta coloring material 2 (3.5) | | | | | | | | | | | | |
| C.I. Acid Red 249 (−4.0) | | | | | | | | | | | | |
| yellow coloring material 1 (24.0) | | | | | 0.5 | 0.5 | | | | | | |
| C.I. Direct Yellow 86 (19.0) | | | | | | | 0.5 | 0.5 | | | | |
| yellow coloring material 2 (18.5) | | | | | | | | | 0.5 | 0.5 | | |
| C.I. Direct Yellow 132 (5.5) | | | | | | | | | | | | |
| C.I. Acid Yellow 23 (3.5) | | | | | | | | | | | | |
| yellow coloring material 3 (−9.0) | | | | | | | | | | | | |
| yellow coloring material 4 (−9.5) | | | | | | | | | | | | |
| glycerin | 20.0 | | 20.0 | | 20.0 | | 20.0 | | 20.0 | | 20.0 | |
| 1,2-hexanediol | | 20.0 | | 20.0 | | 20.0 | | 20.0 | | 20.0 | | 20.0 |
| Acetylenol E100 | 0.4 | 0.4 | 0.4 | 0.4 | 0.4 | 0.4 | 0.4 | 0.4 | 0.4 | 0.4 | 0.4 | 0.4 |
| ion-exchange water | 76.6 | 76.6 | 76.1 | 76.1 | 76.1 | 76.1 | 76.1 | 76.1 | 76.1 | 76.1 | 76.1 | 76.1 |
| $\Delta\lambda_{max1} + \Delta\lambda_{max2}$ | — | | 37.0 | | 49.0 | | 44.0 | | 43.5 | | 18.0 | |

TABLE 3-4

| Compositions | Comparative Examples | | | | | | | | | | | |
|---|---|---|---|---|---|---|---|---|---|---|---|---|
| | 7 | | 8 | | 9 | | 10 | | 11 | | 12 | |
| | H | L | H | L | H | L | H | L | H | L | H | L |
| black coloring material 1 (25.0) | | | | | | | | | | | | |
| black coloring material 2 (18.0) | 3.0 | 3.0 | 3.0 | 3.0 | 3.0 | 3.0 | 3.0 | 3.0 | 3.0 | 3.0 | 3.0 | 3.0 |
| black coloring material 3 (12.0) | | | | | | | | | | | | |
| C.I. Food Black 2 (9.5) | | | | | | | | | | | | |
| black coloring material 4 (0.0) | | | | | | | | | | | | |
| cyan coloring material 1 (6.5) | | | | | | | | | | | | |
| cyan coloring material 2 (2.5) | | | | | | | | | | | | |
| cyan coloring material 3 (1.5) | 0.5 | 0.5 | | | | | | | | | | |
| magenta coloring material 1 (4.5) | | | | | | | | | | | | |
| magenta coloring material 2 (3.5) | | | | | | | | | | | | |
| C.I. Acid Red 249 (−4.0) | | | 0.5 | 0.5 | | | | | | | | |
| yellow coloring material 1 (24.0) | | | | | 0.5 | 0.5 | | | | | | |
| C.I. Direct Yellow 86 (19.0) | | | | | | | 0.5 | 0.5 | | | | |
| yellow coloring material 2 (18.5) | | | | | | | | | 0.5 | 0.5 | | |
| C.I. Direct Yellow 132 (5.5) | | | | | | | | | | | | |
| C.I. Acid Yellow 23 (3.5) | | | | | | | | | | | | |
| yellow coloring material 3 (−9.0) | | | | | | | | | | | 0.5 | 0.5 |
| yellow coloring material 4 (−9.5) | | | | | | | | | | | | |
| glycerin | 20.0 | | 20.0 | | 20.0 | | 20.0 | | 20.0 | | 20.0 | |
| 1,2-hexanediol | | 20.0 | | 20.0 | | 20.0 | | 20.0 | | 20.0 | | 20.0 |
| Acetylenol E100 | 0.4 | 0.4 | 0.4 | 0.4 | 0.4 | 0.4 | 0.4 | 0.4 | 0.4 | 0.4 | 0.4 | 0.4 |
| ion-exchange water | 76.1 | 76.1 | 76.1 | 76.1 | 76.1 | 76.1 | 76.1 | 76.1 | 76.1 | 76.1 | 76.1 | 76.1 |
| $\Delta\lambda_{max1} + \Delta\lambda_{max2}$ | 26.5 | | 21.0 | | 42.0 | | 37.0 | | 36.5 | | 9.0 | |

TABLE 3-5

| | Compositions of Inks | | | | | | | | | | | |
|---|---|---|---|---|---|---|---|---|---|---|---|---|
| | Comparative Examples | | | | | | | | | | | |
| | 13 | | 14 | | 15 | | 16 | | 17 | | 18 | |
| Compositions | H | L | H | L | H | L | H | L | H | L | H | L |
| black coloring material 1 (25.0) | | | | | | | | | | | | |
| black coloring material 2 (18.0) | 3.0 | 3.0 | | | | | | | | | | |
| black coloring material 3 (12.0) | | | 3.0 | 3.0 | | | | | 3.0 | 3.0 | | |
| C.I. Food Black 2 (9.5) | | | | | 3.0 | 3.0 | | | | | | |
| black coloring material 4 (0.0) | | | | | | | 3.0 | 3.0 | | | 3.0 | 3.0 |
| cyan coloring material 1 (6.5) | | | | | | | | | | | | |
| cyan coloring material 2 (2.5) | | | | | | | | | | | | |
| cyan coloring material 3 (1.5) | | | | | | | | | | | | |
| magenta coloring material 1 (4.5) | | | | | | | | | | | | |
| magenta coloring material 2 (3.5) | | | | | | | | | | | | |
| C.I. Acid Red 249 (−4.0) | | | | | | | | | | | | |
| yellow coloring material 1 (24.0) | | | | | | | | | 0.5 | 0.5 | | |
| C.I. Direct Yellow 86 (19.0) | | | | | | | | | | | | |
| yellow coloring material 2 (18.5) | | | | | | | | | | | 0.5 | 0.5 |
| C.I. Direct Yellow 132 (5.5) | | | | | | | | | | | | |
| C.I. Acid Yellow 23 (3.5) | | | | | | | | | | | | |
| yellow coloring material 3 (−9.0) | | | 0.5 | 0.5 | 0.5 | 0.5 | 0.5 | 0.5 | | | | |
| yellow coloring material 4 (−9.5) | 0.5 | 0.5 | | | | | | | | | | |
| glycerin | 20.0 | | 20.0 | | 20.0 | | 20.0 | | 20.0 | | 20.0 | |
| 1,2-hexanediol | | 20.0 | | 20.0 | | 20.0 | | 20.0 | | 20.0 | | 20.0 |
| Acetylenol E100 | 0.4 | 0.4 | 0.4 | 0.4 | 0.4 | 0.4 | 0.4 | 0.4 | 0.4 | 0.4 | 0.4 | 0.4 |
| ion-exchange water | 76.1 | 76.1 | 76.1 | 76.1 | 76.1 | 76.1 | 76.1 | 76.1 | 76.1 | 76.1 | 76.1 | 76.1 |
| $\Delta\lambda_{max1} + \Delta\lambda_{max2}$ | 8.5 | | 3.0 | | 0.5 | | 31 9.0 | | 36.0 | | 18.5 | |

TABLE 4-1

| | Compositions of Inks | | | | | | | | | |
|---|---|---|---|---|---|---|---|---|---|---|
| | Examples | | | | | | | | | |
| | 13 | 14 | 15 | 16 | 17 | 18 | 19 | 20 | 21 | 22 |
| black coloring material 1 (25.0) | 3.0 | 3.0 | 3.0 | 3.0 | 3.0 | 3.0 | 3.0 | 3.0 | 3.0 | 3.0 |
| black coloring material 4 (0.0) | | | | | | | | | | |
| cyan coloring material 3 (1.5) | | | | | | | | | | |
| C.I. Acid Red 249 (−4.0) | | | | | | | | | | |
| yellow coloring material 1 (24.0) | | | | | | | | | | |
| yellow coloring material 2 (18.5) | | | | | | | | | | |
| yellow coloring material 3 (−9.0) | 0.5 | 0.5 | 0.5 | 0.5 | 0.5 | 0.5 | 0.5 | 0.5 | 0.5 | 0.5 |
| yellow coloring material 4 (−9.5) | | | | | | | | | | |
| glycerin | | 10.0 | 10.0 | 10.0 | 10.0 | 10.0 | 10.0 | 10.0 | 10.0 | 10.0 |
| triethylene glycol | | 10.0 | | | | | | | | |
| diethylene glycol | | | 10.0 | | | | | | | |
| 1,2,6-hexanetriol | | | | 10.0 | | | | | | |
| ethylene glycol | | | | | 10.0 | | | | | |
| 2-pyrrolidone | | | | | | 10.0 | | | | |
| 1,2-propanediol | | | | | | | 10.0 | | | |
| 1,4-butanediol | | | | | | | | 10.0 | | |
| γ-butyrolactone | | | | | | | | | 10.0 | |
| 1,5-pentanediol | 10.0 | | | | | | | | | 10.0 |
| 3-methyl-1,5-pentanediol | | | | | | | | | | |
| 1,6-hexanediol | | | | | | | | | | |
| triethylene glycol monobutyl ether | | | | | | | | | | |
| 1,2-hexanediol | 10.0 | | | | | | | | | |
| ethylene glycol monobutyl ether | | | | | | | | | | |
| Acetylenol E100 | 0.4 | 0.4 | 0.4 | 0.4 | 0.4 | 0.4 | 0.4 | 0.4 | 0.4 | 0.4 |
| ion-exchange water | 76.1 | 76.1 | 76.1 | 76.1 | 76.1 | 76.1 | 76.1 | 76.1 | 76.1 | 76.1 |
| $\Delta\lambda_{max1} + \Delta\lambda_{max2}$ | 16.0 | 16.0 | 16.0 | 16.0 | 16.0 | 16.0 | 16.0 | 16.0 | 16.0 | 16.0 |
| first solvent/glycerin | — | 1.0 | 1.0 | 1.0 | 1.0 | 1.0 | 1.0 | 1.0 | 1.0 | 1.0 |
| second solvent/glycerin | — | 0.0 | 0.0 | 0.0 | 0.0 | 0.0 | 0.0 | 0.0 | 0.0 | 0.0 |
| specific solvent/glycerin | — | 1.0 | 1.0 | 1.0 | 1.0 | 1.0 | 1.0 | 1.0 | 1.0 | 1.0 |

TABLE 4-2

Compositions of Inks

| | Examples | | | | | | | | | |
|---|---|---|---|---|---|---|---|---|---|---|
| | 23 | 24 | 25 | 26 | 27 | 28 | 29 | 30 | 31 | 32 |
| black coloring material 1 (25.0) | 3.0 | 3.0 | 3.0 | 3.0 | 3.0 | 3.0 | 3.0 | 3.0 | 3.0 | 3.0 |
| black coloring material 4 (0.0) | | | | | | | | | | |
| cyan coloring material 3 (1.5) | | | | | | | | | | |
| C.I. Acid Red 249 (−4.0) | | | | | | | | | | |
| yellow coloring material 1 (24.0) | | | | | | | | | | |
| yellow coloring material 2 (18.5) | | | | | | | | | | |
| yellow coloring material 3 (−9.0) | 0.5 | 0.5 | 0.5 | 0.5 | 0.5 | 0.5 | 0.5 | 0.5 | 0.5 | 0.5 |
| yellow coloring material 4 (−9.5) | | | | | | | | | | |
| glycerin | 10.0 | 10.0 | 12.0 | 12.0 | 12.0 | 15.0 | 15.0 | 5.0 | 3.0 | 3.0 |
| triethylene glycol | | | | | | | | | | |
| diethylene glycol | | | | | | | | | | |
| 1,2,6-hexanetriol | | | | | | | | | | |
| ethylene glycol | | | | | | | | | | |
| 2-pyrrolidone | | | | | | | | | | |
| 1,2-propanediol | | | | | | | | | | |
| 1,4-butanediol | | | | | | | | | | |
| γ-butyrolactone | | | | | | | | | | |
| 1,5-pentanediol | | | | | | 3.5 | 4.5 | 15.0 | 18.0 | 19.0 |
| 3-methyl-1,5-pentanediol | 10.0 | | | | | | | | | |
| 1,6-hexanediol | | 10.0 | | | | | | | | |
| triethylene glycol monobutyl ether | | | 8.0 | | | | | | | |
| 1,2-hexanediol | | | | 8.0 | | | | | | |
| ethylene glycol monobutyl ether | | | | | 8.0 | | | | | |
| Acetylenol E100 | 0.4 | 0.4 | 0.4 | 0.4 | 0.4 | 0.4 | 0.4 | 0.4 | 0.4 | 0.4 |
| ion-exchange water | 76.1 | 76.1 | 76.1 | 76.1 | 76.1 | 77.6 | 76.6 | 76.1 | 75.1 | 74.1 |
| $\Delta\lambda_{max1} + \Delta\lambda_{max2}$ | 16.0 | 16.0 | 16.0 | 16.0 | 16.0 | 16.0 | 16.0 | 16.0 | 16.0 | 16.0 |
| first solvent/glycerin | 1.0 | 1.0 | 0.0 | 0.0 | 0.0 | 0.2 | 0.3 | 3.0 | 6.0 | 6.3 |
| second solvent/glycerin | 0.0 | 0.0 | 0.7 | 0.7 | 0.7 | 0.0 | 0.0 | 0.0 | 0.0 | 0.0 |
| specific solvent/glycerin | 1.0 | 1.0 | 0.7 | 0.7 | 0.7 | 0.2 | 0.3 | 3.0 | 6.0 | 6.3 |

TABLE 4-3

Compositions of Inks

| | Examples | | | | | | | | |
|---|---|---|---|---|---|---|---|---|---|
| | 33 | 34 | 35 | 36 | 37 | 38 | 39 | 40 | 41 |
| black coloring material 1 (25.0) | 3.0 | 3.0 | 3.0 | 3.0 | 3.0 | 3.0 | 3.0 | 3.0 | 3.0 |
| black coloring material 4 (0.0) | | | | | | | | | |
| cyan coloring material 3 (1.5) | | | | | | | | | |
| C.I. Acid Red 249 (−4.0) | | | | | | | | | |
| yellow coloring material 1 (24.0) | | | | | | | | | |
| yellow coloring material 2 (18.5) | | | | | | | | | |
| yellow coloring material 3 (−9.0) | 0.5 | 0.5 | 0.5 | 0.5 | 0.5 | 0.5 | 0.5 | 0.5 | 0.5 |
| yellow coloring material 4 (−9.5) | | | | | | | | | |
| glycerin | 16.5 | 16.5 | 12.0 | 10.0 | 10.0 | 2.5 | 6.0 | 6.0 | 6.0 |
| triethylene glycol | | | | | | | 7.0 | | |
| diethylene glycol | | | | | | | | | |
| 1,2,6-hexanetriol | | | | | | | | | |
| ethylene glycol | | | | | | | | | |
| 2-pyrrolidone | | | | | | | 7.0 | | 6.0 |
| 1,2-propanediol | | | | | | | | | |
| 1,4-butanediol | | | | | | | | | |
| γ-butyrolactone | | | | | | | | | |
| 1,5-pentanediol | | | | | | 15.0 | | 7.0 | 8.0 |
| 3-methyl-1,5-pentanediol | | | | | | | | | 10.0 |
| 1,6-hexanediol | | | | | | | 7.0 | | |
| triethylene glycol monobutyl ether | | | | | | | | | |
| 1,2-hexanediol | 2.0 | 3.5 | 6.0 | 10.0 | 12.0 | 2.5 | | | |
| ethylene glycol monobutyl ether | | | | | | | | | |
| Acetylenol E100 | 0.4 | 0.4 | 0.4 | 0.4 | 0.4 | 0.4 | 0.4 | 0.4 | 0.4 |
| ion-exchange water | 77.6 | 76.1 | 78.1 | 76.1 | 74.1 | 76.1 | 76.1 | 76.1 | 66.1 |
| $\Delta\lambda_{max1} + \Delta\lambda_{max2}$ | 16.0 | 16.0 | 16.0 | 16.0 | 16.0 | 16.0 | 16.0 | 16.0 | 16.0 |
| first solvent/glycerin | 0.0 | 0.0 | 0.0 | 0.0 | 0.0 | 6.0 | 2.3 | 2.3 | 4.0 |
| second solvent/glycerin | 0.1 | 0.2 | 0.5 | 1.0 | 1.2 | 1.0 | 0.0 | 0.0 | 0.0 |
| specific solvent/glycerin | 0.1 | 0.2 | 0.5 | 1.0 | 1.2 | 7.0 | 2.3 | 2.3 | 4.0 |

TABLE 4-4

Compositions of Inks

| | Examples | | | | | | | Comparative Examples | |
|---|---|---|---|---|---|---|---|---|---|
| | 42 | 43 | 44 | 45 | 46 | 47 | 48 | 19 | 20 |
| black coloring material 1 (25.0) | 3.0 | 3.0 | 3.0 | 3.0 | 3.0 | 3.0 | 3.0 | 3.0 | 3.0 |
| black coloring material 4 (0.0) | | | | 0.5 | | | | | |
| cyan coloring material 3 (1.5) | | | | | 0.5 | | | | |
| C.I. Acid Red 249 (−4.0) | | | | | | 0.5 | | | |
| yellow coloring material 1 (24.0) | | | | | | | | 0.5 | |
| yellow coloring material 2 (18.5) | | | | | | | | | 0.5 |
| yellow coloring material 3 (−9.0) | 0.5 | 0.5 | 0.5 | | | | | | |
| yellow coloring material 4 (−9.5) | | | | | | | 0.5 | | |
| glycerin | 6.0 | 12.0 | 8.0 | 5.0 | 5.0 | 5.0 | 5.0 | 8.0 | 8.0 |
| triethylene glycol | 14.0 | | 4.0 | | | | | 1.0 | 1.0 |
| diethylene glycol | | | | | | | | | |
| 1,2,6-hexanetriol | | | | | | | | | |
| ethylene glycol | | | | | | | | | |
| 2-pyrrolidone | | | | | | | | | |
| 1,2-propanediol | | | | | | | | 0.5 | 0.5 |
| 1,4-butanediol | | | | | | | | | |
| γ-butyrolactone | | | | | | | | | |
| 1,5-pentanediol | | | 4.0 | 15.0 | 15.0 | 15.0 | 15.0 | | |
| 3-methyl-1,5-pentanediol | 10.0 | | | | | | | | |
| 1,6-hexanediol | | | | | | | | | |
| triethylene glycol monobutyl ether | | 4.0 | 2.0 | | | | | 8.0 | 8.0 |
| 1,2-hexanediol | | 4.0 | 2.0 | | | | | 2.0 | 2.0 |
| ethylene glycol monobutyl ether | | | | | | | | | |
| Acetylenol E100 | 0.4 | 0.4 | 0.4 | 0.4 | 0.4 | 0.4 | 0.4 | 0.4 | 0.4 |
| ion-exchange water | 66.1 | 76.1 | 76.1 | 76.1 | 76.1 | 76.1 | 76.1 | 76.6 | 76.6 |
| $\Delta\lambda_{max1} + \Delta\lambda_{max2}$ | 16.0 | 16.0 | 16.0 | 25.0 | 26.5 | 21.0 | 15.5 | 49.0 | 43.5 |
| first solvent/glycerin | 4.0 | 0.0 | 1.0 | 3.0 | 3.0 | 3.0 | 3.0 | 0.2 | 0.2 |
| second solvent/glycerin | 0.0 | 0.7 | 0.5 | 0.0 | 0.0 | 0.0 | 0.0 | 1.3 | 1.3 |
| specific solvent/glycerin | 4.0 | 0.7 | 1.5 | 3.0 | 3.0 | 3.0 | 3.0 | 1.4 | 1.4 |

Evaluation

Each of the inks obtained above was charged into an ink cartridge, and the ink cartridge was installed in an ink jet recording apparatus (trade name "PIXUS iP8600", manufactured by Canon Inc.) in which an ink is ejected from a recording head by the action of thermal energy. In this embodiment, a solid image recorded by applying 22 ng of an ink to a unit region of 1/600 inch×1/600 inch is defined as "recording duty of 100%".

By using the ink jet recording apparatus, a recorded article was fabricated in which solid images of recording duties of 50% and 80% were recorded on a recording medium (PT-101, made by Canon Inc.) under an environment of a temperature of 23° C. and a relative humidity of 55%. The obtained recorded article was dried under an environment of a temperature of 23° C. and a relative humidity of 55% for 24 hours. The color measurement of the image was carried out by measuring L, a, b and the optical density by using a spectrophotometer (trade name "Spectrolino," made by GretagMacbeth GmbH) under the condition of a light source of D50 and a visual field of 2°. Here, L, a and b are L*, a* and b* in L*a*b colorimetric system prescribed by CIE (Commission Internationale de l'Eclairage).

Color Tone

Color measurements were carried out on solid images of a recording duty of 50% in recorded articles obtained using each ink of Examples and Comparative Examples shown in Tables 3-1 to 3-5. Respective values for the compositions H were represented by $a_1$ and $b_1$, and respective values for the compositions L were represented by $a_2$ and $b_2$. $\Delta C^* = \{(a_1-a_2)^2 + (b_1-b_2)^2\}^{1/2}$ was calculated from the obtained values a and b, and the color tone was evaluated according to the following evaluation criterion. The evaluation results are shown in Table 5. In the present evaluation, assuming the case where images were recorded by superposing other inks, $\Delta C^*$ was determined from each image recorded with each ink of the compositions H and the compositions L. The case where $\Delta C^*$ was small, even in the case where the polarities of inks were different, gave a small difference in the color tone between images, thus meaning that the color tone change was suppressed. In the present invention, AA and A were defined as acceptable levels, and B and C were defined as non-acceptable levels under the following evaluation criterion.

AA: $\Delta C^*$ was less than 5.
A: $\Delta C^*$ was 5 or more and less than 8.
B: $\Delta C^*$ was 8 or more.
C: the image had bronzing observed.

Ozone Resistance

Optical densities (which were before the ozone resistance test) were measured for solid images of a recording duty of 50% in the recorded articles obtained using each ink of the compositions L of Examples and Comparative Examples shown in Tables 3-1 to 3-5. The recorded articles were placed in an ozone testing apparatus (trade name "OMS-H," made by Suga Test Instruments Co., Ltd.), and exposed to ozone under the conditions of a chamber interior temperature of 23° C., a relative humidity of 50% and an ozone gas concentration of 10 ppm for 24 hours. Thereafter, optical densities (which were after the ozone resistance test) of the solid images in the recorded articles were measured. The residual ratio of the optical density=(optical density after the ozone resistance test/optical density before the ozone resistance test)×100(%) was calculated from the obtained optical density before the ozone resistance test and optical density after the ozone resistance test, and the ozone resistance was evaluated according to the following evaluation criterion. The evaluation results are shown in Table 5. In the present invention, A was defined as an acceptable level, and B, C and D were defined as non-acceptable levels under the following evaluation criterion.

A: the residual ratio of the optical density was 85% or more.
B: the residual ratio of the optical density was 80% or more and less than 85%.
C: the residual ratio of the optical density was 50% or more and less than 80%.
D: the residual ratio of the optical density was less than 50%.

Humidity Resistance $L_1$, $a_1$ and $b_1$ (which were Lab values before the humidity resistance test) were measured for solid images of a recording duty of 50% in the recorded articles obtained using each ink of Examples and Comparative Examples shown in Tables 4-1 to 4-4. The recorded articles were placed in an environment of a temperature of 25° C. and a relative humidity of 85% for 3 days, and thereafter further placed in an environment of a temperature of 23° C. and a relative humidity of 55% for 24 hours. Thereafter, $L_2$, $a_2$ and $b_2$ (which were Lab values after the humidity resistance test) of the solid images in the recoded articles were measured. $\Delta E$ (color difference)=$\{(L_1-L_2)^2+(a_1-a_2)^2+(b_1-b_2)^2\}^{1/2}$ was calculated from the obtained Lab values before the humidity resistance test and Lab values after the humidity resistance test, and the humidity resistance was evaluated according to the following evaluation criterion. The evaluation results are shown in Table 6. AA, A and B were defined as acceptable levels, and C was defined as a non-acceptable level under the following evaluation criterion.

AA: $\Delta E$ was less than 2.0.
A: $\Delta E$ was 2.0 or more and less than 2.5.
B: $\Delta E$ was 2.5 or more and less than 4.0.
C: $\Delta E$ was 4.0 or more.

Bronzing Resistance

Solid images of a recording duty of 80% in the recorded articles obtained using each ink of Examples and Comparative Examples shown in Tables 4-1 to 4-4 were visually checked, and the bronzing resistance was evaluated according to the following evaluation criterion. The evaluation results are shown in Table 6. In the present invention, AA, A and B were defined as acceptable levels, and C and D were defined as non-acceptable levels under the following evaluation criterion.

AA: no bronzing phenomenon was observed.
A: slight color change was observed depending on observation angles.
B: slight glittering was observed depending on observation angles.
C: glittering was observed.
D: glittering was conspicuous.

TABLE 5

| | | Evaluation Results | |
|---|---|---|---|
| | | Color Tone | Ozone Resistance |
| Examples | 1 | A | A |
| | 2 | A | A |
| | 3 | A | A |
| | 4 | A | A |
| | 5 | A | A |
| | 6 | A | A |
| | 7 | A | A |
| | 8 | A | A |
| | 9 | A | A |
| | 10 | A | A |
| | 11 | AA | A |
| | 12 | AA | A |

TABLE 5-continued

| | | Evaluation Results | |
|---|---|---|---|
| | | Color Tone | Ozone Resistance |
| Comparative Examples | 1 | B | A |
| | 2 | B | A |
| | 3 | C | A |
| | 4 | B | A |
| | 5 | B | A |
| | 6 | A | B |
| | 7 | A | B |
| | 8 | A | B |
| | 9 | B | B |
| | 10 | B | B |
| | 11 | B | B |
| | 12 | A | B |
| | 13 | A | B |
| | 14 | A | C |
| | 15 | A | C |
| | 16 | A | B |
| | 17 | B | C |
| | 18 | A | C |

TABLE 6

| | | Evaluation Results | |
|---|---|---|---|
| | | Humidity Resistance | Bronzing Resistance |
| Examples | 13 | B | AA |
| | 14 | A | A |
| | 15 | AA | AA |
| | 16 | A | A |
| | 17 | A | A |
| | 18 | A | A |
| | 19 | A | A |
| | 20 | AA | AA |
| | 21 | A | A |
| | 22 | AA | AA |
| | 23 | AA | AA |
| | 24 | AA | AA |
| | 25 | A | A |
| | 26 | A | A |
| | 27 | A | A |
| | 28 | AA | B |
| | 29 | AA | AA |
| | 30 | AA | AA |
| | 31 | AA | AA |
| | 32 | B | AA |
| | 33 | A | B |
| | 34 | A | A |
| | 35 | A | A |
| | 36 | A | A |
| | 37 | B | A |
| | 38 | B | AA |
| | 39 | A | A |
| | 40 | AA | AA |
| | 41 | AA | AA |
| | 42 | AA | AA |
| | 43 | A | A |
| | 44 | AA | AA |
| | 45 | AA | AA |
| | 46 | AA | AA |
| | 47 | AA | AA |
| | 48 | AA | AA |
| Comparative Examples | 19 | B | D |
| | 20 | B | D |

Sticking Resistance

Inks of Comparative Examples 21 to 56 were prepared using the same compositions as in the inks of Examples 13 to 48, respectively, except for increasing the contents of the second coloring materials from 0.5% in the inks of Examples 13 to 48 to 3.5%, and decreasing the contents of ion-exchange water by 3.0% (the total amount: 100.0%). The inks of Examples 13 to 48 and Comparative Examples 21 to 56 were each filled in an ink cartridge, which was then loaded on the same ink jet recording apparatus as in the above. The recovery operation (cleaning) of a recording head was carried out one time by using the ink jet recording apparatus, and thereafter, a nozzle check pattern was recorded and whether normal recording had been carried out was checked. Thereafter, the recording head was made in a state of not performing capping by pulling off a power source cable in the course of a carriage operation. With this state being kept, the ink jet recording apparatus was allowed to stand under the condition of a temperature of 30° C. and a relative humidity of 10% for 14 days. Thereafter, the recovery operation was carried out using the ink jet recording apparatus, and thereafter, a nozzle check pattern was recorded; this procedure was repeated.

The obtained nozzle check pattern was visually observed, and the sticking resistance was evaluated. As a result, in the case of using the inks of Examples 13 to 48, by the recovery operation of one time to three times, all ejection orifices were recovered to a ejectable state and the nozzle check patterns were normally recorded. By contrast, in the case of using the inks of Comparative Examples 21 to 56, even if the recovery operation was carried out three times, a large number of ejection orifices from which the inks could not be ejected were present, and nozzle check patterns could not be normally recorded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-194878, filed Sep. 5, 2012, which is hereby incorporated by reference herein in its entirety.

What is claimed is:

1. An ink jet ink comprising a first coloring material and a second coloring material,
wherein the first coloring material is a black coloring material exhibiting a difference $\Delta\lambda_{max1}$ ($=\lambda_{maxD1}-\lambda_{maxW1}$) of 20.0 or more between a maximum absorption wavelength ($\lambda_{maxD1}$) in a 20.0% by mass aqueous solution of 1,2-hexanediol and a maximum absorption wavelength ($\lambda_{maxW1}$) in water in a UV-Vis absorption spectrum;
wherein the second coloring material is a coloring material exhibiting a difference $\Delta\lambda_{max2}$ ($=\lambda_{maxD2}-\lambda_{maxW2}$) of 12.0 or less between a maximum absorption wavelength ($\lambda_{maxD2}$) in a 20.0% by mass aqueous solution of 1,2-hexanediol and a maximum absorption wavelength ($\lambda_{maxW2}$) in water in a UV-Vis absorption spectrum;
wherein a sum of the $\Delta\lambda_{max1}$ and the $\Delta\lambda_{max2}$ is 35.0 or less;
wherein the second coloring material comprises at least one selected from the group consisting of a compound represented by the following general formula (II), C.I. Food Black 2, C.I. Direct Blue 199, a compound represented by the following general formula (IV), a compound represented by the following general formula (V), C.I. Direct Red 227, C.I. Acid Red 289, a compound represented by the following general formula (VI), a compound represented by the following general formula (VII), C.I. Acid Red 249, C.I. Direct Yellow 132, C.I. Acid Yellow 23, C.I. Acid Yellow 17 and a compound represented by the following general formula (VIII); and
wherein a sum total of a content (% by mass) of the first coloring material and a content (% by mass) of the second coloring material in the ink is 6.0% by mass or less based on a total mass of the ink:

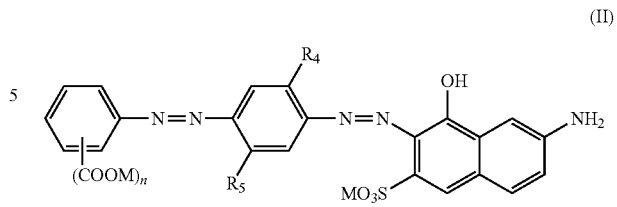

wherein in the general formula (II), $R_4$ and $R_5$ each independently represent an alkoxy group substituted with a hydroxy group and having 1 to 4 carbon atoms; n represents 1 to 3; and
M each independently represents a hydrogen atom, an alkali metal, an ammonium or an organic ammonium,

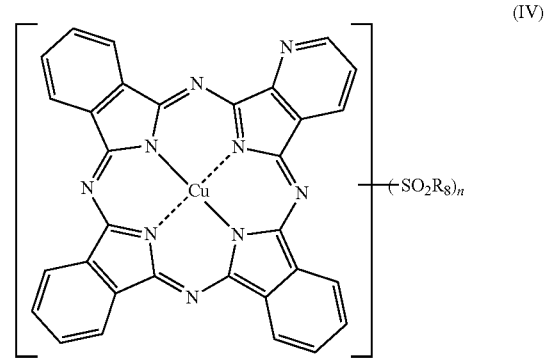

wherein in the general formula (IV), $R_8$ each independently represent an alkyl group having 1 to 4 carbon atoms, and the alkyl group may be substituted with an anionic group, a sulfonamide group, a hydroxy group, an alkyl group having 1 to 4 carbon atoms or a combined group of at least two thereof; and n represents 3 or 4,

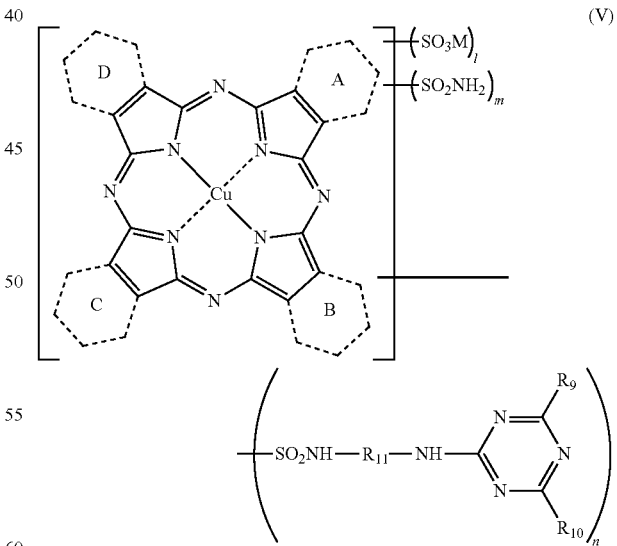

wherein in the general formula (V), rings A, B, C and D indicated by broken lines each independently represent an aromatic ring or a heteroaromatic ring; $R_9$ represents an anilino group substituted with 1 to 3 anionic groups; $R_{10}$ represents an amino group or an alkoxy group having 1 to 4 carbon atoms; $R_{11}$ represents an alkylene group having 1 to 4 carbon atoms; M each independently represents a hydrogen atom, an alkali metal, an ammonium or an organic ammonium; and l represents 0 to 4, m represents 1 to 3, n represents 1 to 3, and l+m+n represents 1 to 4, (VI)

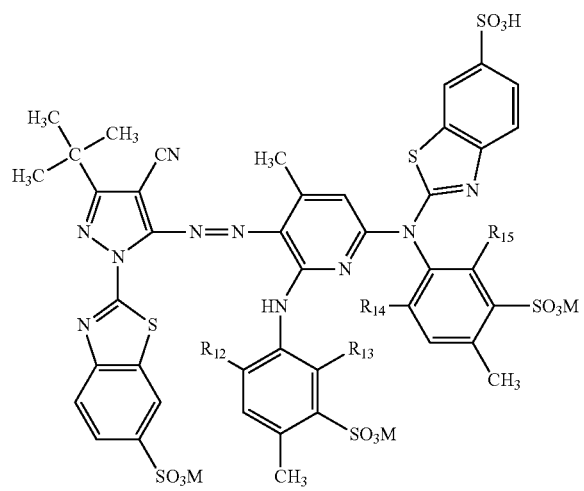

wherein in the general formula (VI), $R_{12}$, $R_{13}$, $R_{14}$ and $R_{15}$ each independently represent an alkyl group having 1 to 4 carbon atoms; and M each independently represents a hydrogen atom, an alkali metal, an ammonium or an organic ammonium, (VII)

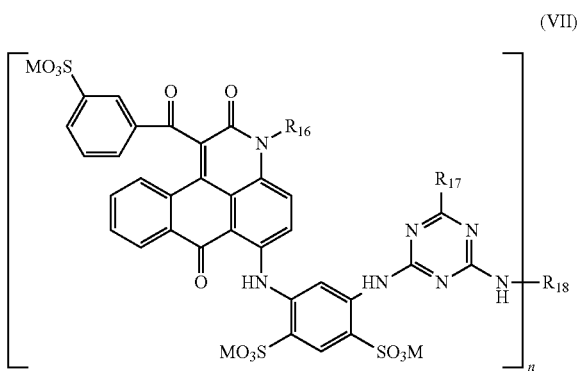

wherein in the general formula (VII), $R_{16}$ represents a hydrogen atom or an alkyl group having 1 to 4 carbon atoms; $R_{17}$ represents an aryloxy group substituted with 1 to 3 anionic groups, or a hydroxy group; n represents 1 or 2; when n=1, $R_{18}$ represents an aryl group substituted with 1 to 3 anionic groups, and when n=2, $R_{18}$ represents an alkylene group having 1 to 4 carbon atoms; and M each independently represents a hydrogen atom, an alkali metal, an ammonium or an organic ammonium, and (VIII)

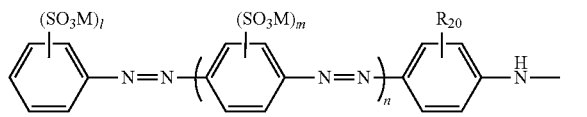

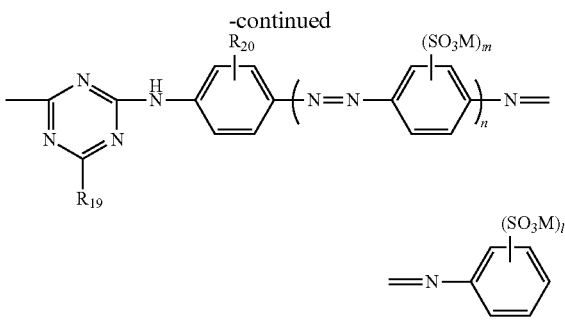

wherein in the general formula (VIII), $R_{19}$ represents an aliphatic amine residue having an anionic group and having 1 to 4 carbon atoms; $R_{20}$ each independently represents a hydrogen atom, an alkyl group having 1 to 4 carbon atoms, or an alkoxy group having 1 to 4 carbon atoms, and the alkyl group and the alkoxy group may be substituted with an anionic group; n represents 0 or 1; M each independently represents a hydrogen atom, an alkali metal, an ammonium or an organic ammonium; and l and m each independently represent 1 or 2.

2. The ink according to claim 1, wherein the second coloring material is at least one selected from the group consisting of a compound represented by the general formula (II), C.I. Food Black 2, C.I. Direct Blue 199, a compound represented by the general formula (IV), a compound represented by the general formula (V), C.I. Direct Red 227, C.I. Acid Red 289, a compound represented by the general formula (VI), a compound represented by the general formula (VII), C.I. Acid Red 249, C.I. Acid Yellow 23, C.I. Acid Yellow 17 and a compound represented by the general formula (VIII).

3. The ink according to claim 1, wherein $\Delta\lambda_{max2}$ of the second coloring material is 0.0 or less; and a sum of the $\Delta\lambda_{max1}$ and the $\Delta\lambda_{max2}$ is 20.0 or less.

4. The ink according to claim 1, wherein the second coloring material is a compound represented by the general formula (VIII).

5. The ink according to claim 4, wherein $R_{19}$ in a compound represented by the general formula (VIII) is —NH—$CH_2CH_2$—$SO_3M$ wherein M represents a hydrogen atom, an alkali metal, an ammonium or an organic ammonium.

6. The ink according to claim 1, wherein the first coloring material comprises a compound represented by the following general formula (I):

(I)

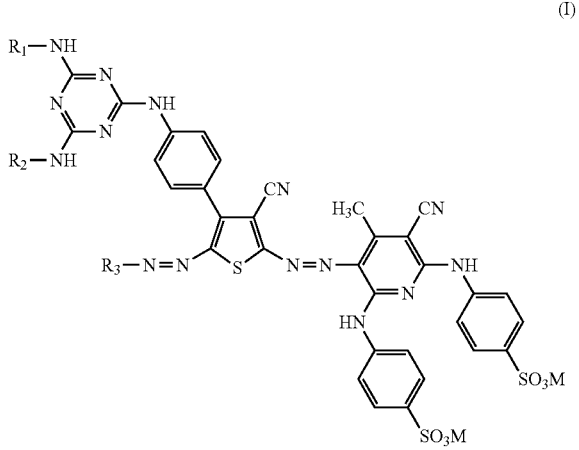

wherein in the general formula (I), $R_1$ and $R_2$ each independently represent an alkyl group having 1 to 4 carbon atoms or an aryl group which may be substituted with an anionic group; $R_3$ represents an aryl group, and the aryl group may be substituted with a cyano group or an anionic group; and M each independently represents a hydrogen atom, an alkali metal, an ammonium or an organic ammonium.

7. The ink according to claim 1, wherein the sum total of the content (% by mass) of the first coloring material and the content (% by mass) of the second coloring material in the ink is 1.0% by mass or more based on the total mass of the ink.

8. The ink according to claim 1, wherein the content (% by mass) of the first coloring material is 1.0 times or more and 10.0 times or less the content (% by mass) of the second coloring material in terms of mass ratio based on the total mass of the ink.

9. The ink according to claim 1, further comprising glycerin.

10. The ink according to claim 9, wherein the ink satisfies at least one of the following Conditions A and B, and the following Condition C:

Condition A: the ink comprises a first water-soluble organic solvent having a Log Pow value of −1.8 or more and less than 0.0, and a content (% by mass) of the first water-soluble organic solvent is 0.3 times or more and 6.0 times or less a content (% by mass) of the glycerin in terms of mass ratio based on the total mass of the ink;

Condition B: the ink comprises a second water-soluble organic solvent having a Log Pow value of 0.0 or more and 0.9 or less, and the content (% by mass) of the second water-soluble organic solvent is 0.2 times or more and 1.0 times or less the content (% by mass) of the glycerin in terms of mass ratio based on the total mass of the ink; and Condition C: a content (% by mass) of a water-soluble organic solvent having a Log Pow value of −1.8 or more and 0.9 or less is 0.2 times or more and 6.0 times or less the content (% by mass) of the glycerin in terms of mass ratio based on the total mass of the ink.

11. The ink according to claim 10, wherein the first water-soluble organic solvent comprises a compound having a hydroxy group on each of both terminals of the main chain thereof, and having 4 to 6 atoms of the main chain between the two hydroxy groups.

12. An ink cartridge comprising an ink and an ink storage portion storing the ink, wherein the ink comprises the ink according to claim 1.

13. An ink jet recording method comprising ejecting an ink from a recording head of an ink jet system to record an image on a recording medium, wherein the ink comprises the ink according to claim 1.

14. The ink according to claim 1, wherein the first coloring material and the second coloring material are dyes.

15. The ink according to claim 1, wherein the ink has a color tone of gray to black.

* * * * *